(12) United States Patent
Main

(10) Patent No.: US 12,013,202 B1
(45) Date of Patent: Jun. 18, 2024

(54) BORE INSTRUMENTATION FOR AMMUNITION ROUND

(71) Applicant: Richard E. Main, Fredericksburg, VA (US)

(72) Inventor: Richard E. Main, Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 334 days.

(21) Appl. No.: 17/465,552

(22) Filed: Sep. 2, 2021

(51) Int. Cl.
*F41A 31/00* (2006.01)
*F16B 7/04* (2006.01)

(52) U.S. Cl.
CPC ............. *F41A 31/00* (2013.01); *F16B 7/042* (2013.01)

(58) Field of Classification Search
CPC ................................ F41A 31/00; F16B 7/042
See application file for complete search history.

(56) References Cited

U.S. PATENT DOCUMENTS

| | | | | |
|---|---|---|---|---|
| 5,711,083 A | * | 1/1998 | Bidwell | G01B 5/12 33/783 |
| 6,718,645 B2 | * | 4/2004 | Berger | F42B 35/00 33/550 |
| 8,677,644 B1 | * | 3/2014 | Main | F42B 35/00 33/542.1 |
| 10,724,837 B2 | * | 7/2020 | Hall | F42B 5/105 |
| 2023/0384070 A1 | * | 11/2023 | Hall | F42B 14/067 |

* cited by examiner

*Primary Examiner* — Octavia Davis Hollington
(74) *Attorney, Agent, or Firm* — Gerhard W. Thielman

(57) ABSTRACT

An instrumentation article is provided for removably attaching to an ammunition round in a gun chamber and connecting to a cable that extends through the chamber. The cable provides tensile pull and signal communication through the chamber. The article has a longitudinal axis that corresponds to the chamber. The article includes a cap structure, an electronics package, a grip assembly, a lock mechanism and a release device. The cap structure connects to the cable. The electronics package provides electrical power and attaches to the cap structure for communication with the round. The grip assembly attaches to the round. The release device connects the electronics package to the lock mechanism. The lock mechanism is disposed between the release device and the grip assembly and rotates in first and second directions along the axis. The lock mechanism latches the claw assembly to the round by manual rotation in the first direction. The lock mechanism withdraws the grip assembly from the round by automatic rotation in the second direction. The release device unlatches the lock mechanism.

9 Claims, 31 Drawing Sheets

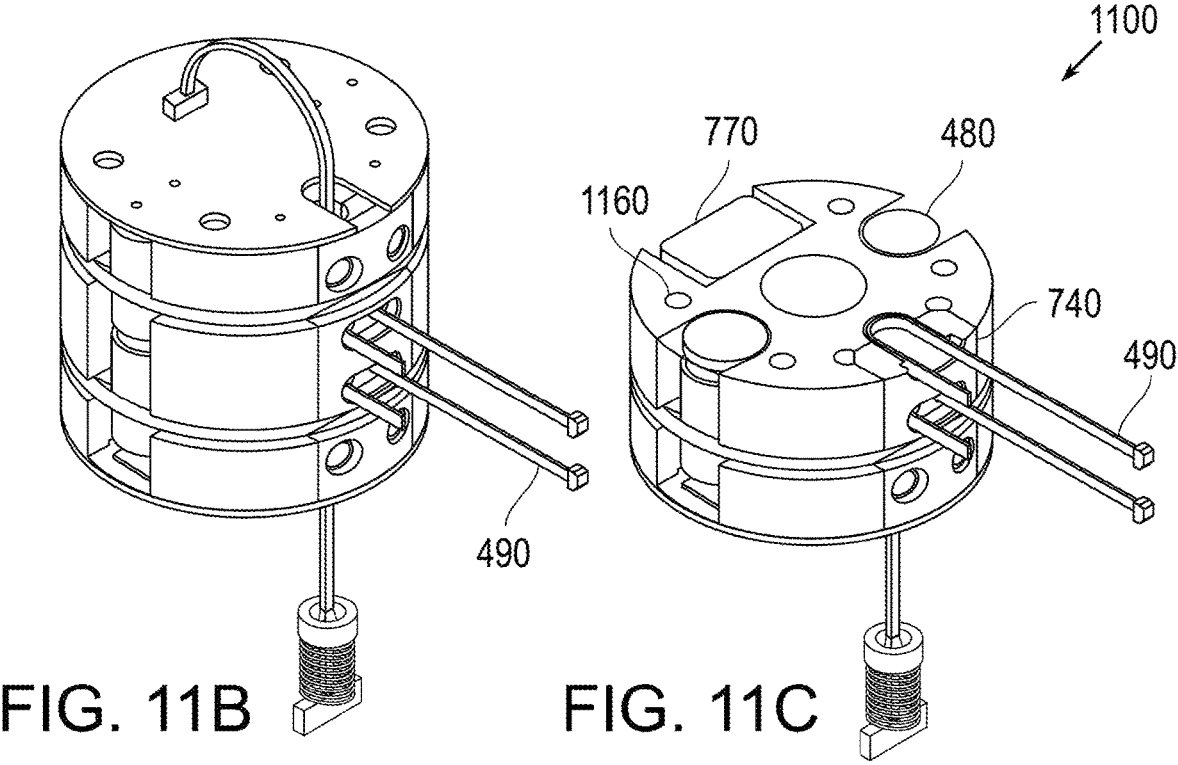
FIG. 11B
FIG. 11C
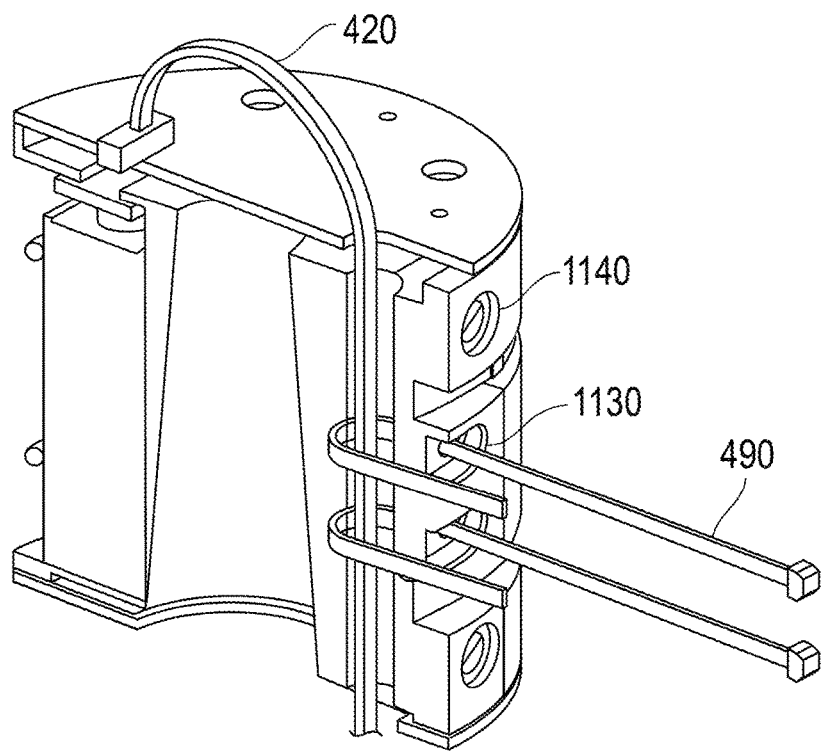
FIG. 11D

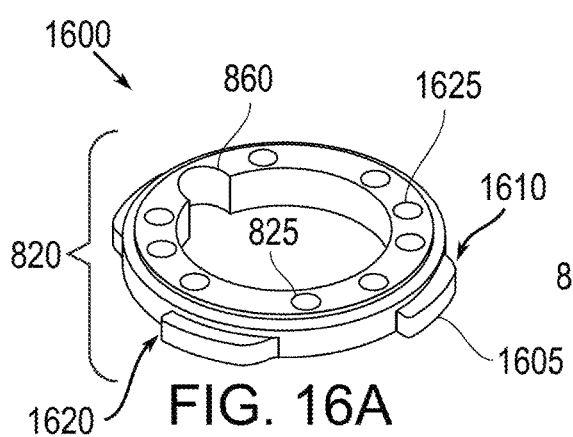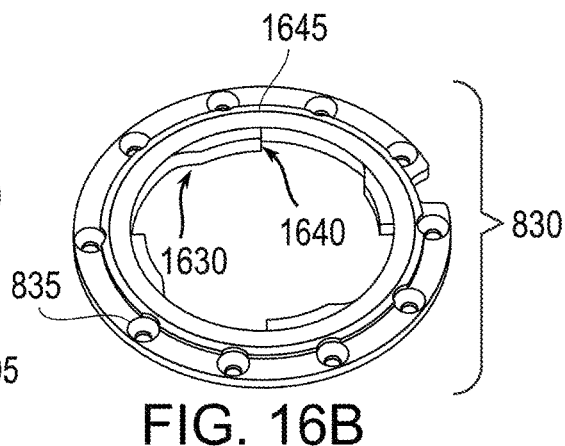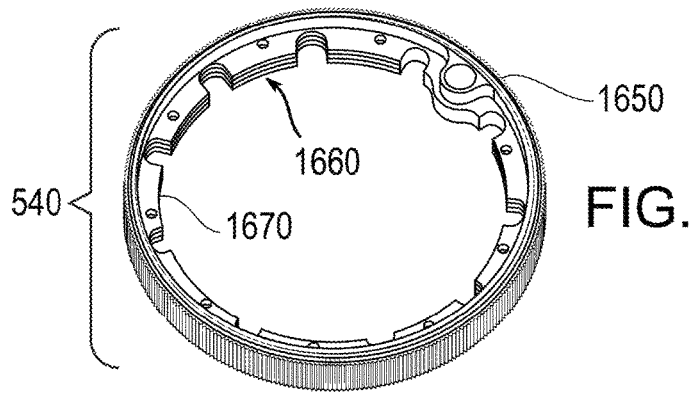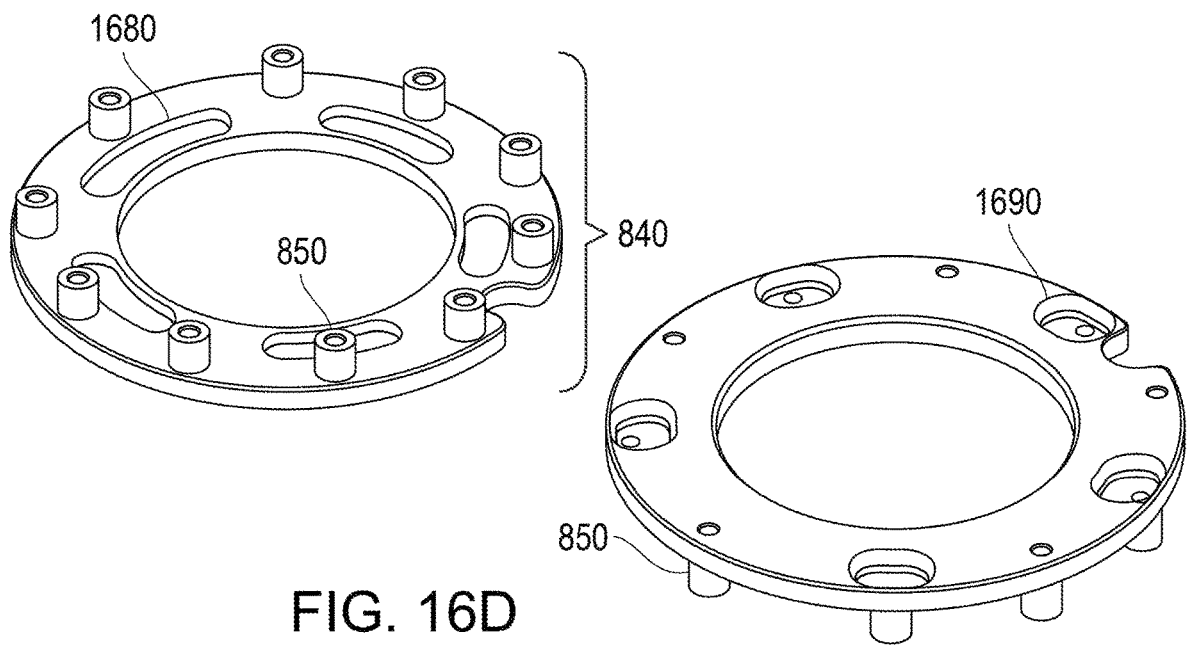

BORE INSTRUMENTATION FOR AMMUNITION ROUND

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to test articles for artillery guns. In particular, the invention relates to an instrumentation device that attaches to an artillery round for purposes of providing test measurements while inside a gun breech prior to firing.

A fuze setter is used to prepare an artillery round for firing from a navy ship. Most artillery rounds have some type of safe/arm fuze attached to the nose. These fuzes can be in a safe (i.e., dormant) mode while the artillery rounds are stored in their ammunition bays on the ship. This renders them safer during all operations, especially in the event the ship is taking on enemy fire or during any type of shipboard fire. When the gun crew is called to fire a round or multiple rounds, the round undergoes a sequence of events in the ammunition handling system, including setting the fuse.

This fuze setter quickly activates the fuze, turning it live, i.e., the fuze is still in a safe mode but it is now active sensing for g-forces and/or spin rate, such as to indicate gun launch. This motion switches the fuze to its armed mode, usually with a short delay to enable the artillery round to reach a certain distance away from the ship before arming itself and engaging in target search after gun launch detection. In some cases, the fuze setter also instructs the fuze what type of mode to explode the munition in, on target, before the target, at a set altitude, or a certain delay after impact. This is what makes modern ordnance more lethal but safer to handle and store on the ship. This sleep mode for the fuze also enables any incorporated batteries to last longer.

The Naval Surface Warfare Center—Dahlgren has large caliber test guns available with functioning fuze setters. However, when developing something new that is not backward compatible with existing fuzes and fuze setters, engineering must resolve the safe/arm challenges for the test range, while also addressing all other safety concerns range officials might have with our test setup. In this situation, engineering must develop some manner of initializing the test round or communicating with it remotely and safely.

SUMMARY

Conventional ammunition test articles yield disadvantages addressed by various exemplary embodiments of the present invention. In particular, these embodiments provide an instrumentation article for removably attaching to an ammunition round in a gun chamber and connecting to a cable. The cable provides tensile pull and signal communication through the chamber. The article has a longitudinal axis that corresponds to the chamber. The article includes a cap structure, an electronics package, a grip assembly, a lock mechanism and a release device. The cap structure connects to the cable. The electronics package provides electrical power and attaches to the cap structure for communication with the round. The grip assembly attaches to the round. The release device connects the electronics package to the lock mechanism. The lock mechanism is disposed between the release device and the grip assembly and rotates in first and second axial directions. The lock mechanism latches the claw assembly to the round by manual rotation in the first direction, and withdraws the grip assembly from the round by automatic rotation in the second direction. The release device unlatches the lock mechanism.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 11A, 11B, 11C and 11D are isometric views of a battery retainer;

FIGS. 16A, 16B, 16C and 16D are isometric views of an insert ring, fore plate, edge ring and aft plate;

FIGS. 20A, 20B, 200 and 20D are plan assembly views of an aft section;

DETAILED DESCRIPTION

Figure 1:
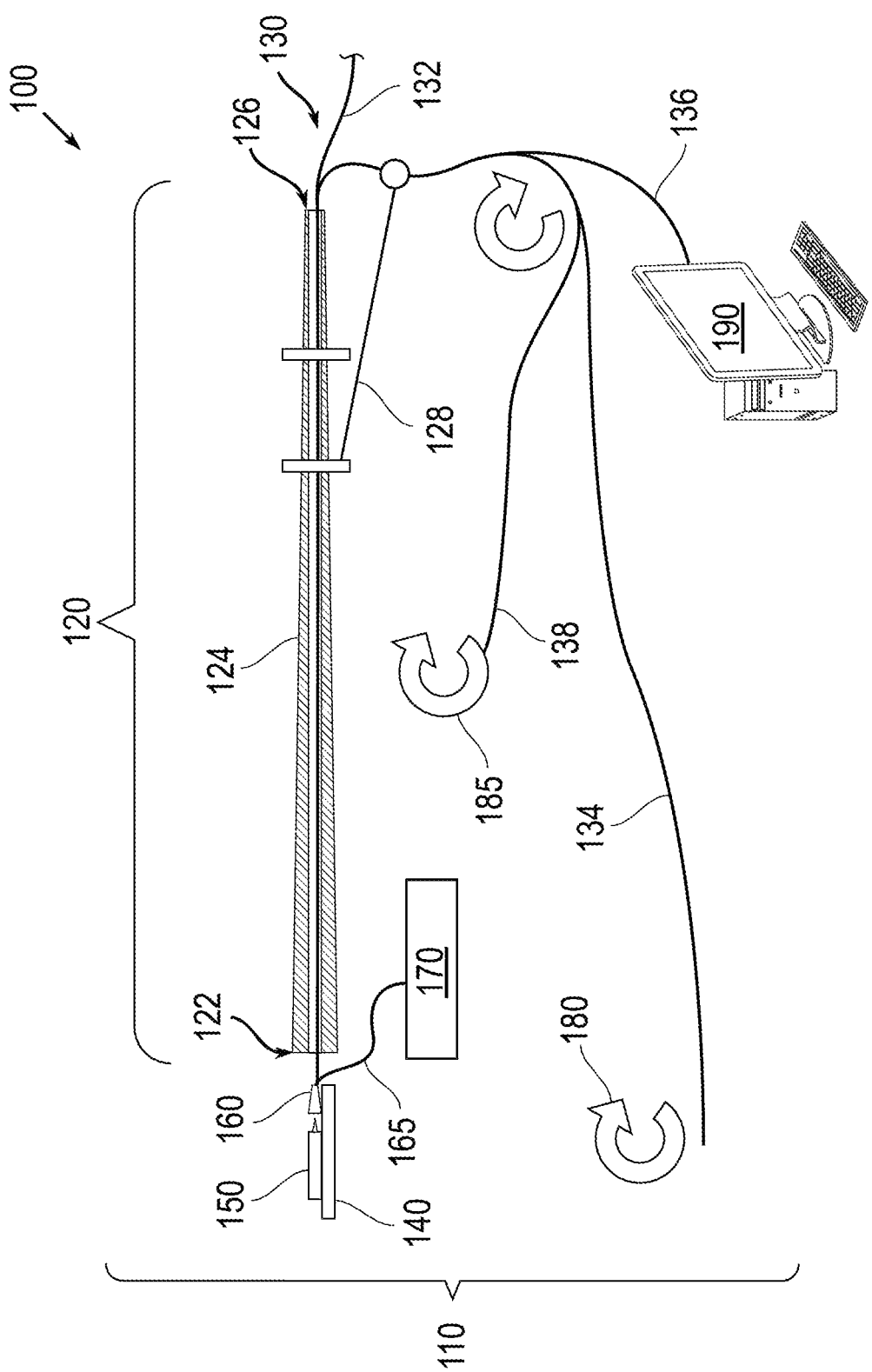
FIG. 1 is a diagram view of an artillery gun test assembly.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in inches (in) or feet (ft) or millimeters (mm), mass in pounds-mass ($lb_m$), time in minutes (min) or seconds (s), angles in degrees (°) and force in pounds-force ($lb_f$). Supplemental measures can be derived from these, such as velocity in feet-per-second (ft/s), density in pounds-mass-per-cubic-inch ($lb_m/in^3$) and the like.

The exemplary article is designed to protect electronics from a gun test environment. This includes batteries for backup power as well as provide external voltage through an umbilical to the round as needed. The article is designed to incorporate shunting to mitigate safety. In addition to all of the electronic interface requirements, there were many mechanical challenges. Dahlgren employees reviewed the engineering problem of designing a new artillery round that requires more advanced communication than the conventional fuse setter could deliver. They decided the path forward for testing is to extend a communications and power umbilical through the muzzle of the gun, back to the guns breech and connect it to the Inaugurated Launch Package (ILP) as a test round with some type of gripping device. The exemplary article as a hood mechanism now constitutes that device to connect a communications and power umbilical between the ILP and a computer remotely positioned in the fire control room, while test round inside the ILP maintains a "live feed" while in the gun.

The hood mechanism as the exemplary article is capable of being remotely removed from the ILP and the gun barrel quickly and easily. This is accomplished by an operator in the fire control room just before the test round is fired. Once range control gives the all-clear to fire, one needs capability of remotely removing the communications umbilical and hood mechanism as quick as possible, then fire the test round. The actions of clear to fire by range control, the gun crew remotely remove the communications and power umbilical cord and hood mechanism, then firing the test round—all of these were design requirements with as short of time as possible. The exemplary article is also reusable and thus can be interchanged from one ILP to another ILP very quickly in the field on test day, thereby minimizing rage time and cost.

FIG. 1 shows a diagram view 100 of a generic test assembly 110. A gun 120 that loads from a breech 122 extending through a chamber 124 of the barrel to eject its projectile out from a muzzle 126. A catch arm 128 attaches to the barrel of the gun 120. A combination umbilical 130 extends from the breech 122 through the chamber 124 out the muzzle 126. This umbilical 130 comprises a release pin pull string 132, a wire cable 134, a communication link 136 and a bungee cord or rope 138. A loading tray 140 supports an inaugurated launch package (ILP) or munition test round 150 and an instrument hood article 160. The gun 120 can be a naval artillery piece with a 5-inch diameter or 155 mm bore, or else a railgun. A keyfill cord 165 connects the tip of the article 160 to a keyfill device 170 for electronic safety. The exemplary hood article 160 is designed to weigh no more than about 6 $lb_m$ for the 5-inch bore.

Three lines of the umbilical 130 are attached together and run through the chamber 124 to provide tensile pull for removing the article 160, as well as signal communications to the article 160, and thereby to the sabot round 150. These lines include the pull string 132, used to unlock the exemplary article 160; the wire cable 134 from the electric winch 180; and the communication link 136, used to provide remote safe/arming and live feed communications to the article 160. Applying duct tape every sixteen inches apart, the wire cable 134 and the communication link 136 are taped together with two inches of slack in the communication link 136 purposefully arranged at the article 160, when the wire cable 134 is pulled through the chamber 124 to avoid tension on the communication link 136.

The pull string 132 is secured to the wire cable 134 and communications line 136 with masking tape 590 every sixteen inches about halfway into the barrel. The pull string 132 is also arranged with two inches of slack purposefully arranged at the article 160. These three lines: string 132, cable 134 and link 136 are all pulled through the chamber 124 from the muzzle 126 to the loading tray 140; however only the cable 134 and link 136 are threaded through the catch arm 128. The pull string 132 terminates a few feet out from the muzzle 126 of the gun 120. The wire cable 134 terminates behind the gun mount and attaches to the electric winch 180. The communication link 136 is run back to a computer 190 in the fire control room. A length of bungee rope 138 is loosely attached to the wire cable 134 just outside of the catch arm 128 and terminates behind the gun mount at a manual winch 185.

Figure 2:
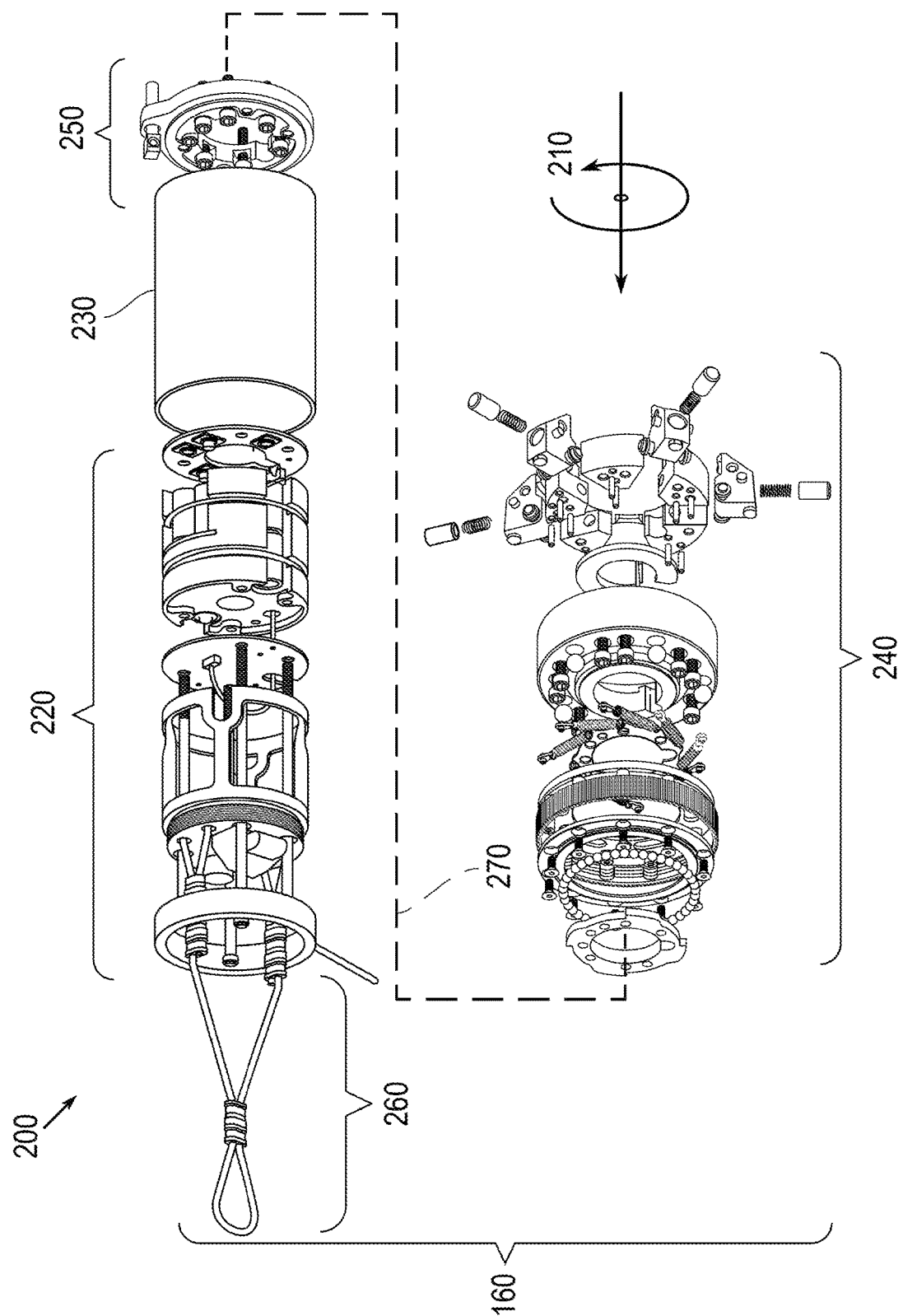
FIG. 2 is an isometric exploded view of an exemplary instrumentation hood article.

FIG. 2 shows an isometric exploded view 200 of associated components for the exemplary instrumentation hood article 160 with orientation denoted by a compass rose 210 featuring an axial linear direction forward (towards the muzzle 126 in the gun 120) and an anti-clockwise angular direction (from the right-hand rule) orthogonal to the longitudinal axis. The components featured in view 200 (and described in more detail in subsequent drawings) include: a fore section 220, an outer sleeve 230, an aft section 240, and a release mechanism 250. A wire loop connector 260 extends forward of the fore section 220 by about eight inches for the exemplary configuration. A dash centerline 270 illustrates the axial assembly arrangement.

Figure 4:
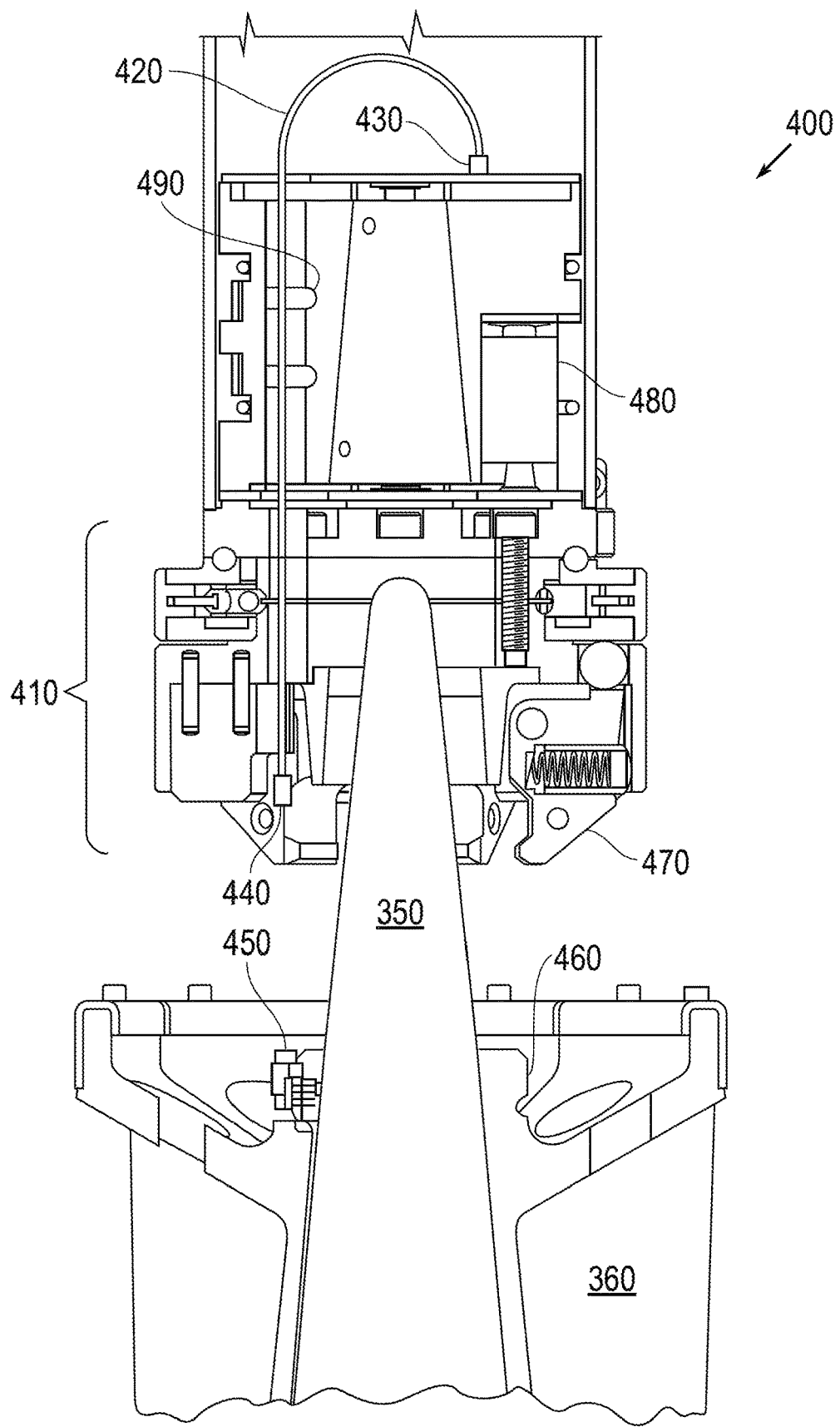
FIG. 4 is an elevation detail view of the article and test round.

For purposes of description, the release mechanism 250 and the aft section 240 are treated as a combination in FIGS. 4 and 10, but these two components are distinguished in this description for explanatory purposes. For the remainder of the drawings, the components are introduced sequentially, with functional descriptions of their interactions described subsequently. All combined, the fore section 220 provides power, remote communications safe/arming and a rigged connection to the aft section 240, which provides a retractable damping mechanism to the round 150. A loop connector 260 secures the fore assembly 220 to the wire cable 134. The fore section 220 provides three main functions:

(1) mechanically connecting the wire cable 134 and the aft section 240;
(2) protecting the batteries/electronics from the test environment; and
(3) providing a safe attaching point for the communication link 136, and the shunt plug/keyfill devices.

Figure 3A:
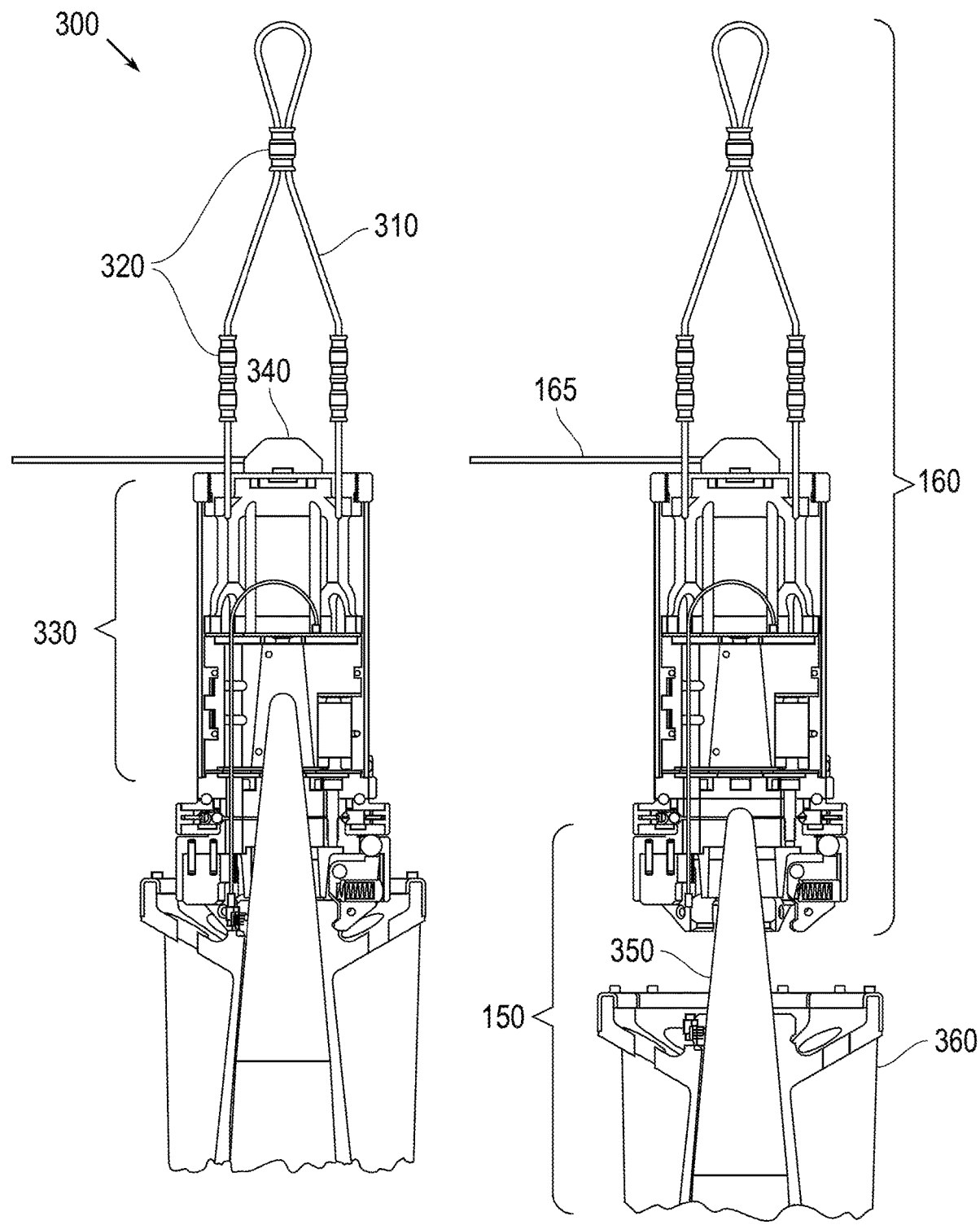
FIGS. 3A and 3B are elevation assembly views of the article and test round.
Figure 3B:
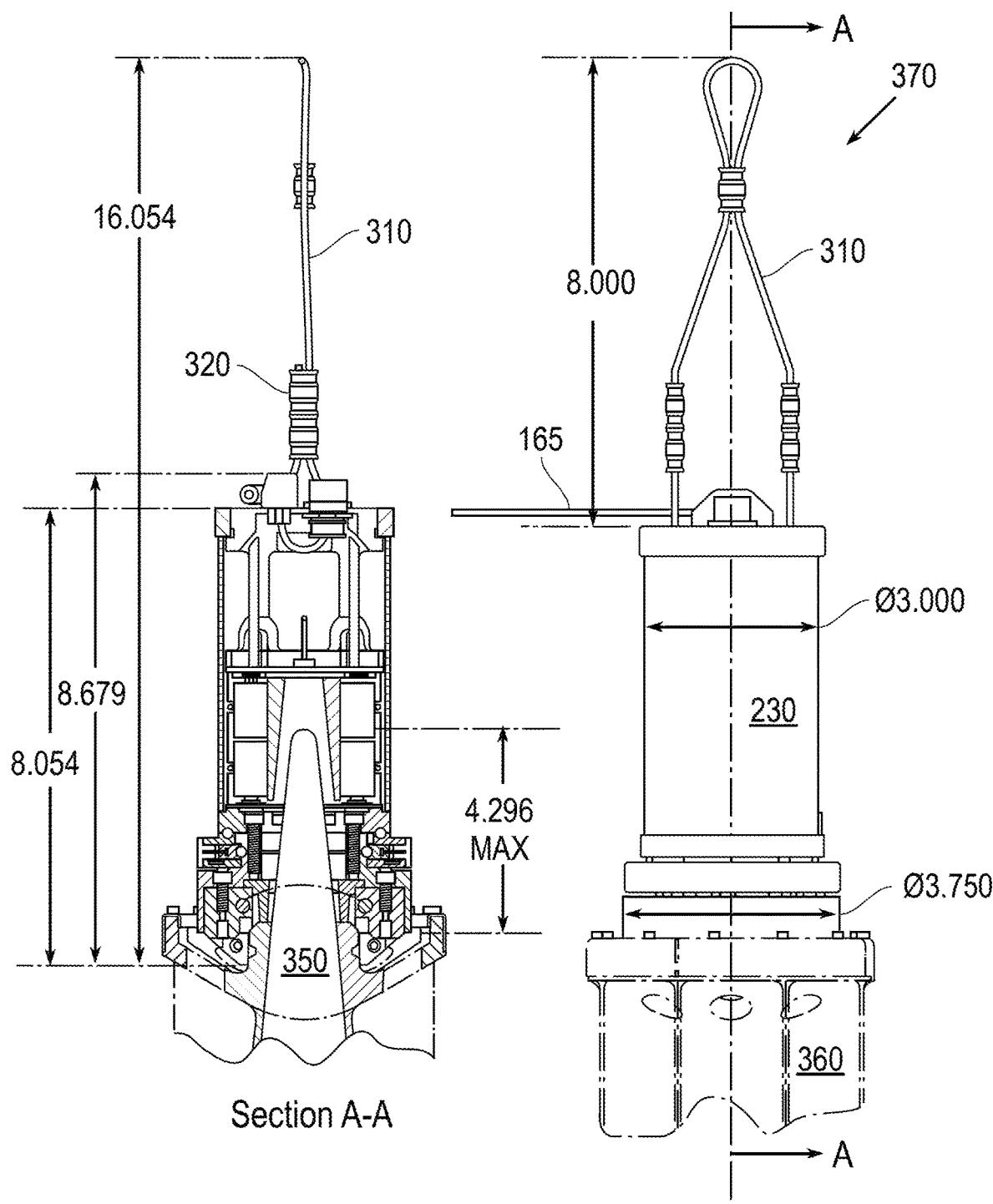

FIG. 3A shows an elevation assembly cross-section view 300 of the article 160 and the round 150 as attached (left) and detached (right). A pull cable loop 310 of wire rope held by cinches 320 form the loop connector 260 that connects the wire cable 134 to the remote electric winch 180 for removal of the article 160. A fore assembly 330 includes the components of the fore section 220 within the sleeve 230. A keyfill device 340 is disposed forward of the fore assembly 330. The test round 150 comprises a rounded conical projectile 350 and a sabot 360 surrounding it. The sabot 360 enables a sub-caliber projectile 350 to be fired from the bore of the gun 120 and detaches after exiting the muzzle 126. FIG. 3B shows an elevation assembly view 370 of the article 160 and round 150 with select exemplary dimensions for the 5-inch gun 120.

FIGS. 3A and 3B show elevation assembly views 300 of the article 160 and the round 150. A pull cable loop 310 of wire rope held by cinches 320 form the loop connector 260 connecting the wire cable 134 to the remote electric winch 180 for removal of the article 160. The test round 150 comprises a rounded conical projectile 350 and a sabot 360 surrounding it. The sabot 360 enables a sub-caliber projectile 350 to be fired from the bore of the gun 120 and detaches after exiting the muzzle 126.

Figure 5A:
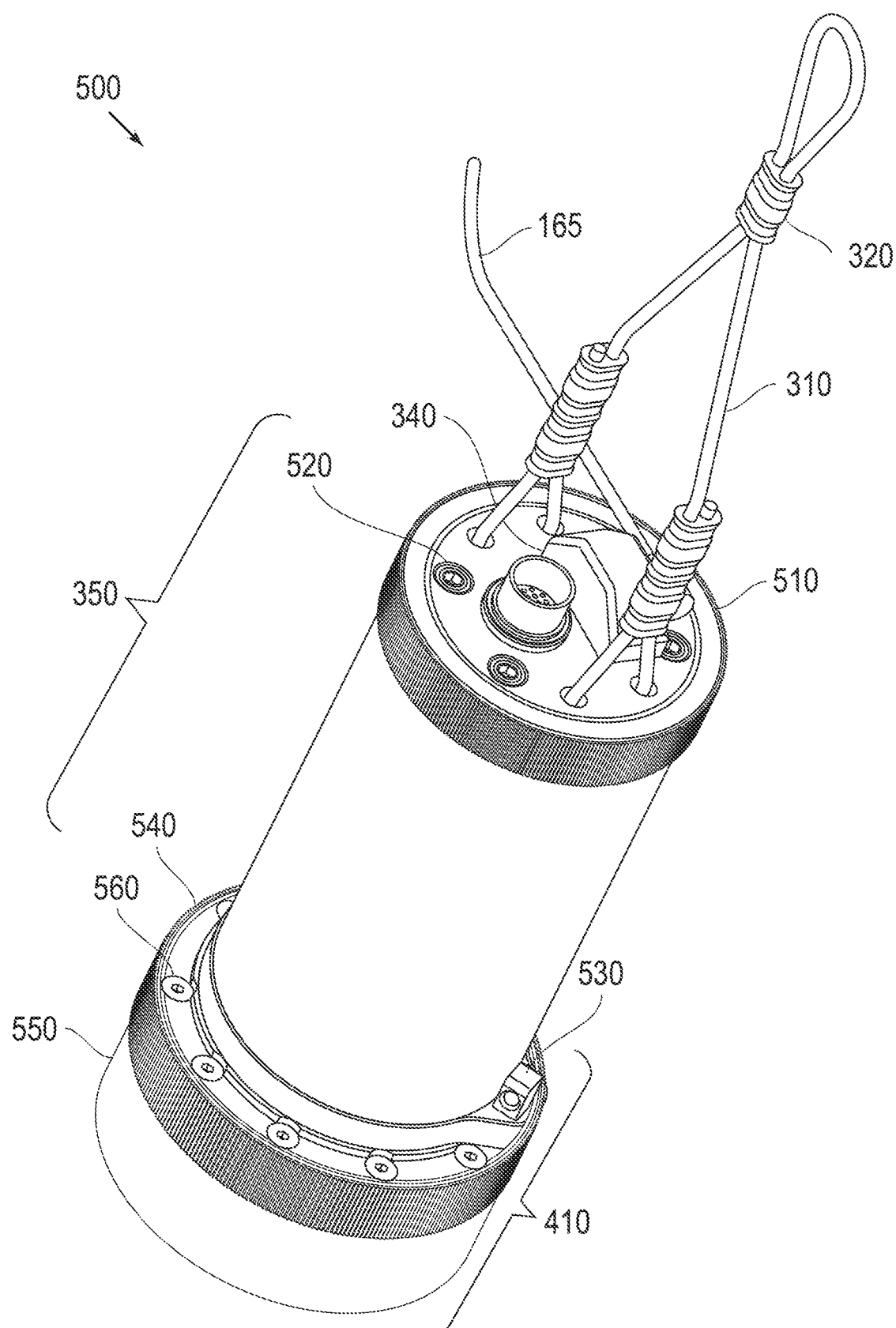
FIGS. 5A and 5B are isometric assembly views of the article.
Figure 5B:
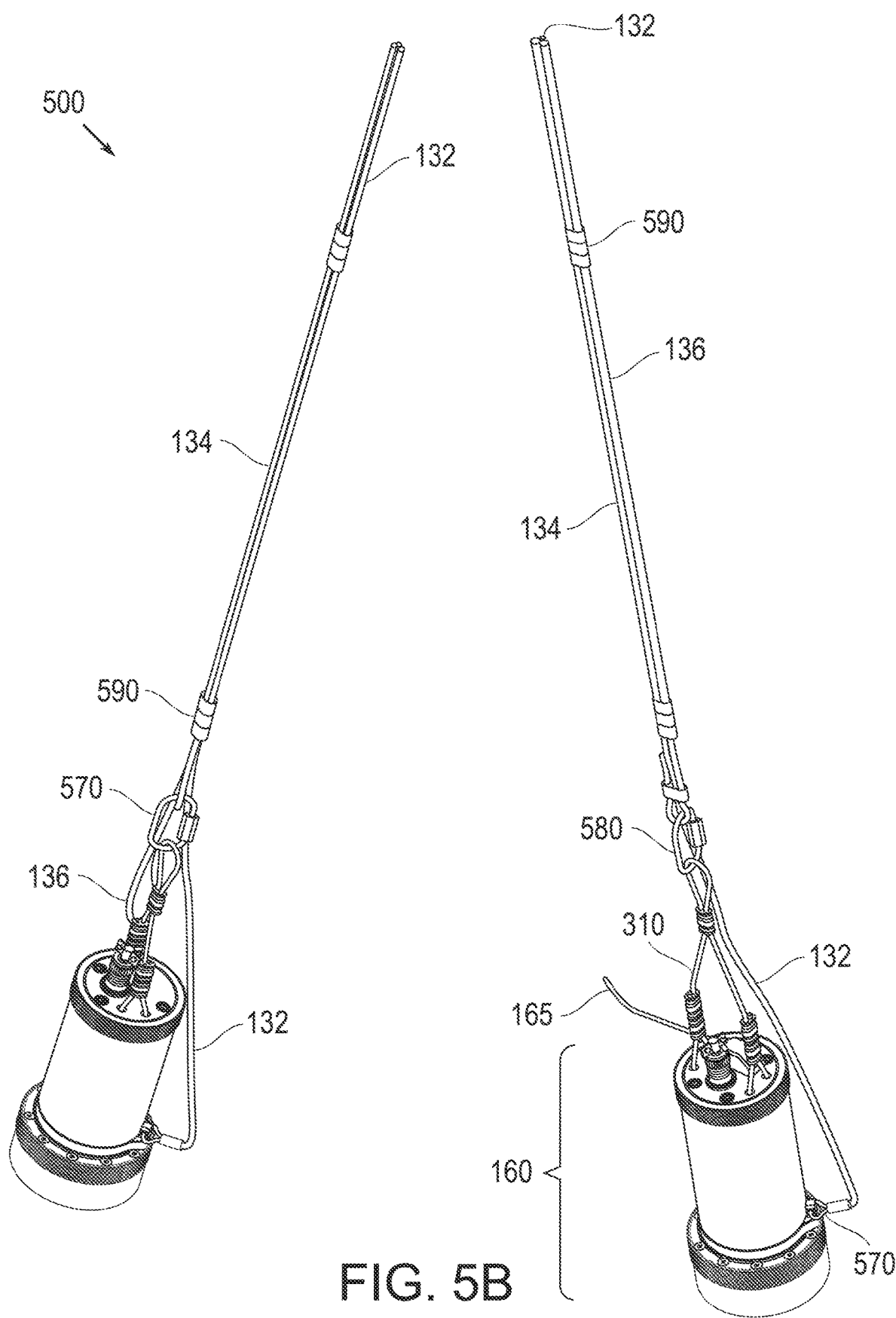
Figure 5C:
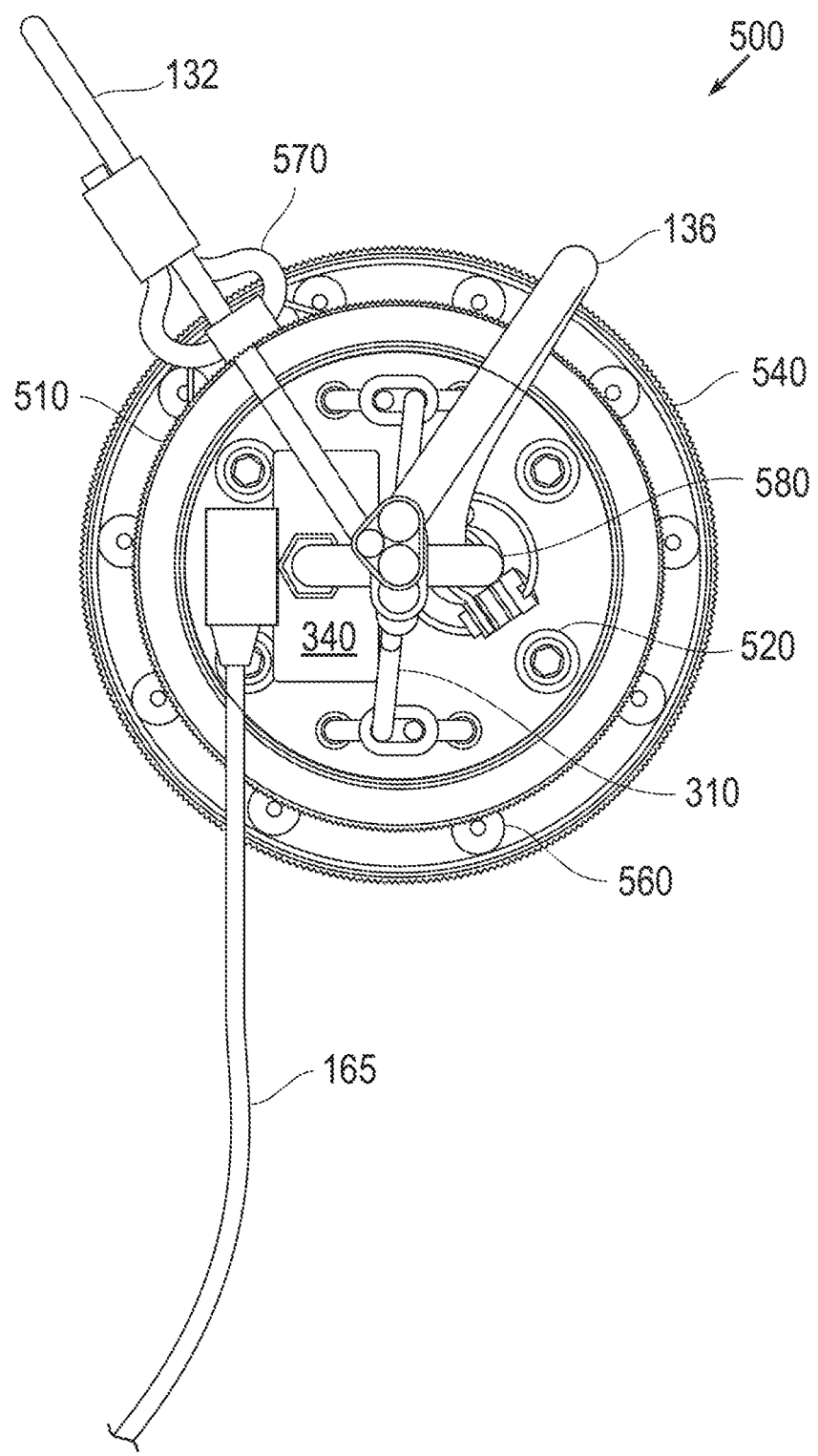
FIG. 5C is a plan assembly view of the article.

FIGS. 5A, 5B and 5C show assembly views 500 of the hood article 160. FIGS. 5A and 5B feature isometric perspectives while FIG. 5C features a plan perspective. A serrated retaining ring 510 extends forward of the outer sleeve 230 with a diameter of 3.125 inch. Four angularly distributed long socket hex bolts 520 secure the fore assembly 330 longitudinally. A release pin 530 enables controllable detachment of the mechanical assembly 410 from the projectile 350. Before insertion of the article 160 into the chamber 124, the pull string 132 is attached to the release pin 530. The mechanical assembly 410 includes a serrated edge ring 540 and an annular housing 550, secured by flathead screws 560. The release pin 530 connects to the pull string 132 via a kink 570. The link 136 connects to the loop 310 via a screw carabiner 580. The pull string 132, cable 134 and link 136 are connected together by adhesive masking tape 590.

Figure 6:
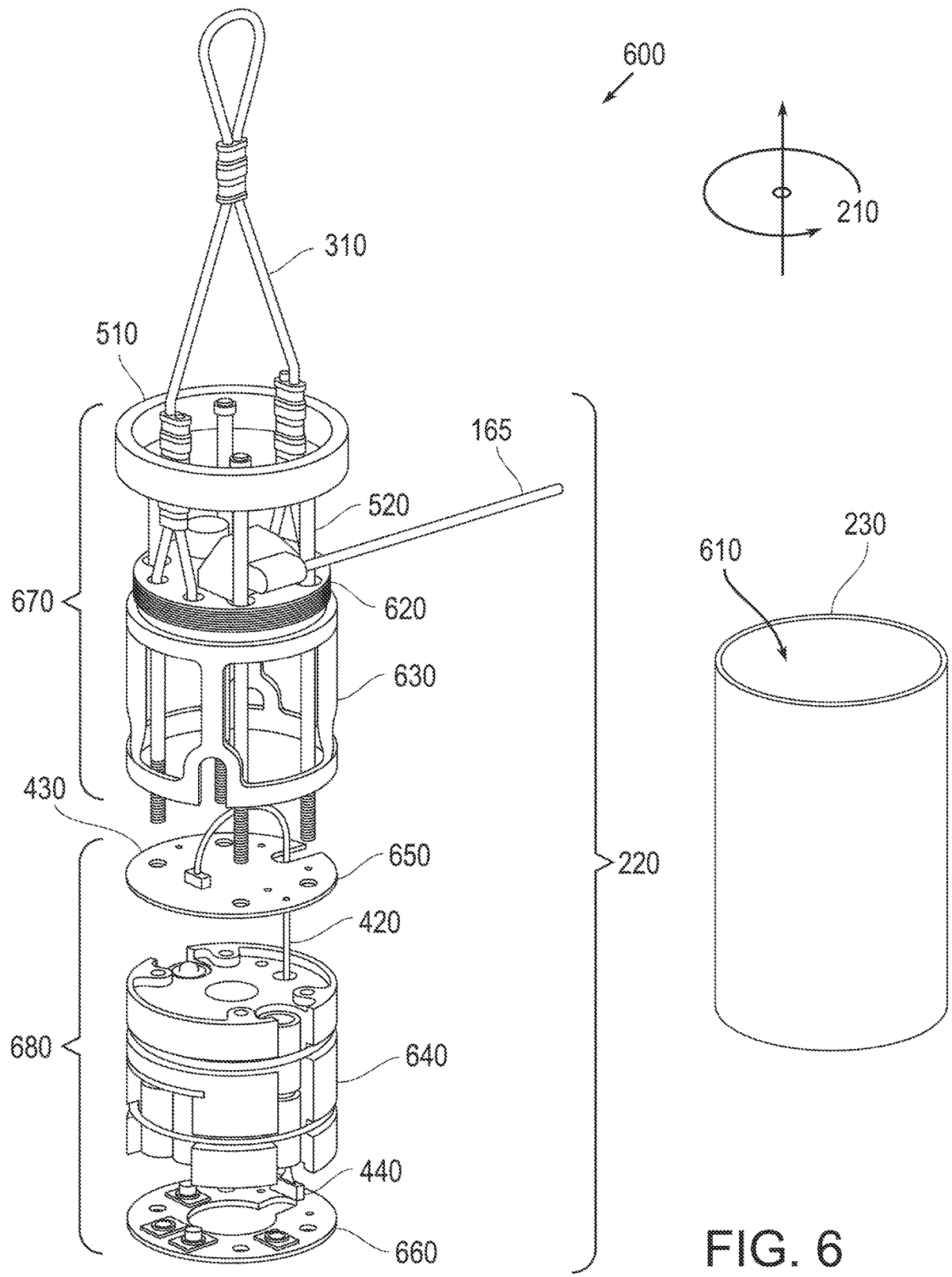
FIG. 6 is an isometric exploded view of the fore section.

FIG. 6 shows an isometric exploded view 600 of the fore section 220 that fits inside a cylindrical volume 610 bounded by the steel outer sleeve 230, which has a diameter of 3.000 inches. Components are displayed axially as indicated by the compass rose 210. The serrated retaining ring 510 screws into a threaded cap lid 620 attached to a cage housing 630. The cable loop 310 attaches to the cap lid 620 by lacing the wire cable 134 through holes in the cap lid 620 and secured with cinches 320. A battery retainer 640 attaches to the cage housing 630 axially flanked by a fore circuit board 650 and an aft circuit board 660.

Figure 9:
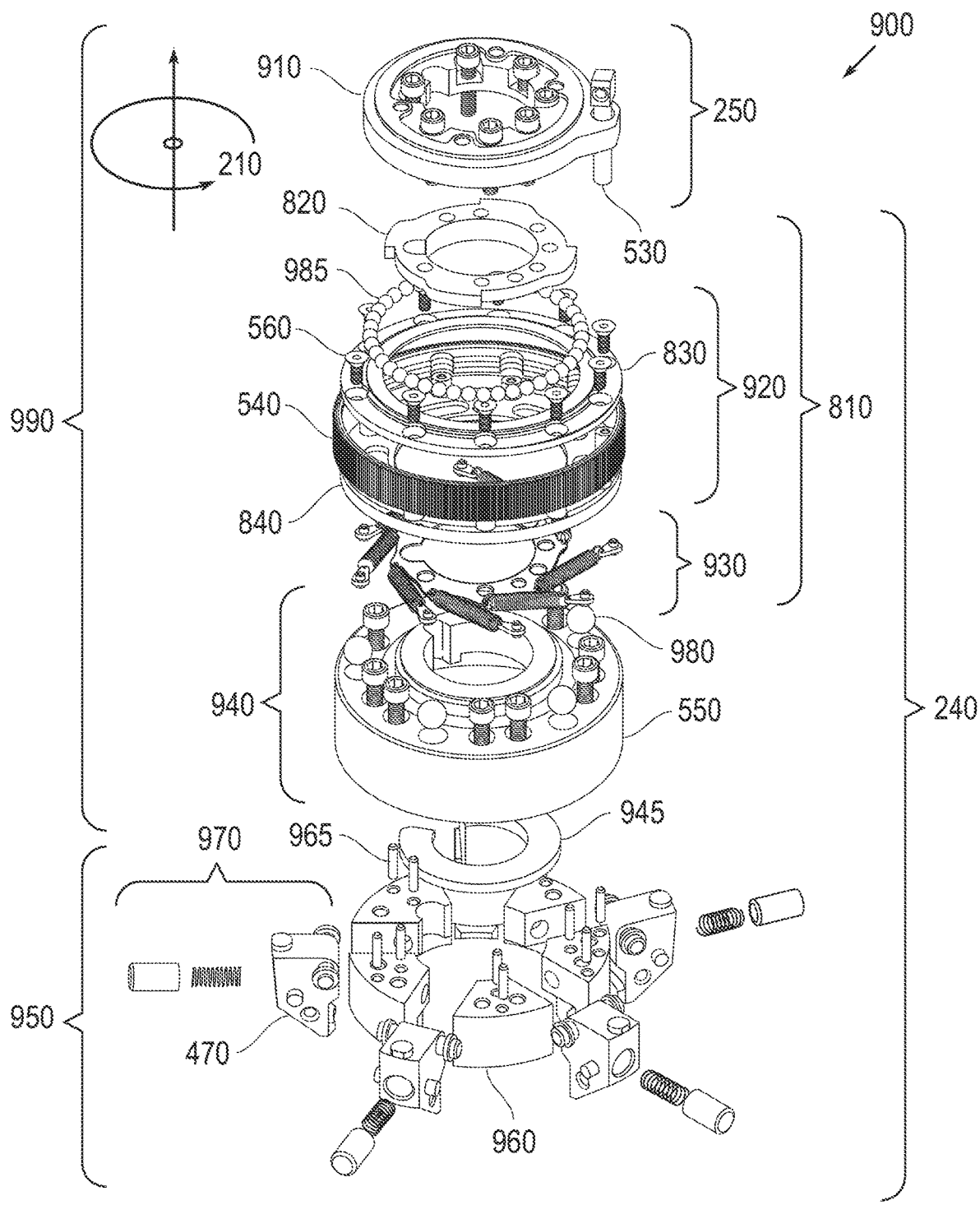
FIG. 9 is an isometric exploded view of an aft section.

The cap lid 620 and cage housing 630 comprise a cap module 670, shown as a unitary component. The retainer 640 with the circuit boards 650 and 660 comprise an electronics module 680. The fore circuit board 650 includes a receptacle for the fore connector 430. The four long socket hex bolts 520 secure the cap module 670 to the electronics module 680. These 10-32 cap long bolts 520 are laced through the cage housing 630, printed circuit board 650, battery retainer 640 and printed circuit board 660, and finally into the aft section 240 (specifically a thrust bearing shown in FIG. 9). To alleviate concerns of asymmetric loading, the pigtail wire 420 passes through the electronics module 680 through channel gaps. The nano-d connectors 430 and 440 employ a 29-pin configuration, and cost about $300 each. Thus, to reduce test expenses, preserving the nano-d connectors 430 and 440 is a design objective of the exemplary article 160. A 9-pin D-style connector at the cap lid 620 enables connection to the keyfill device 340, or a shunt plug (not shown).

Figure 7A:
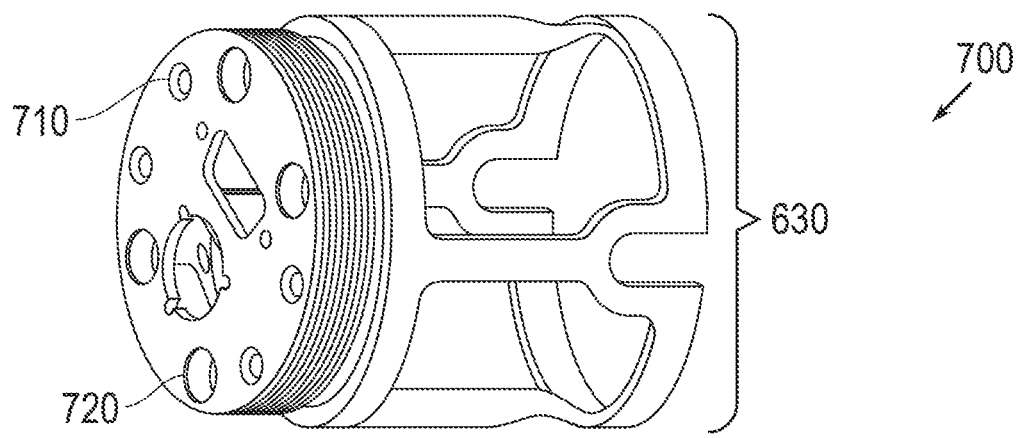
FIGS. 7A and 7B are isometric views of the cage housing and the electronics module.
Figure 7B:
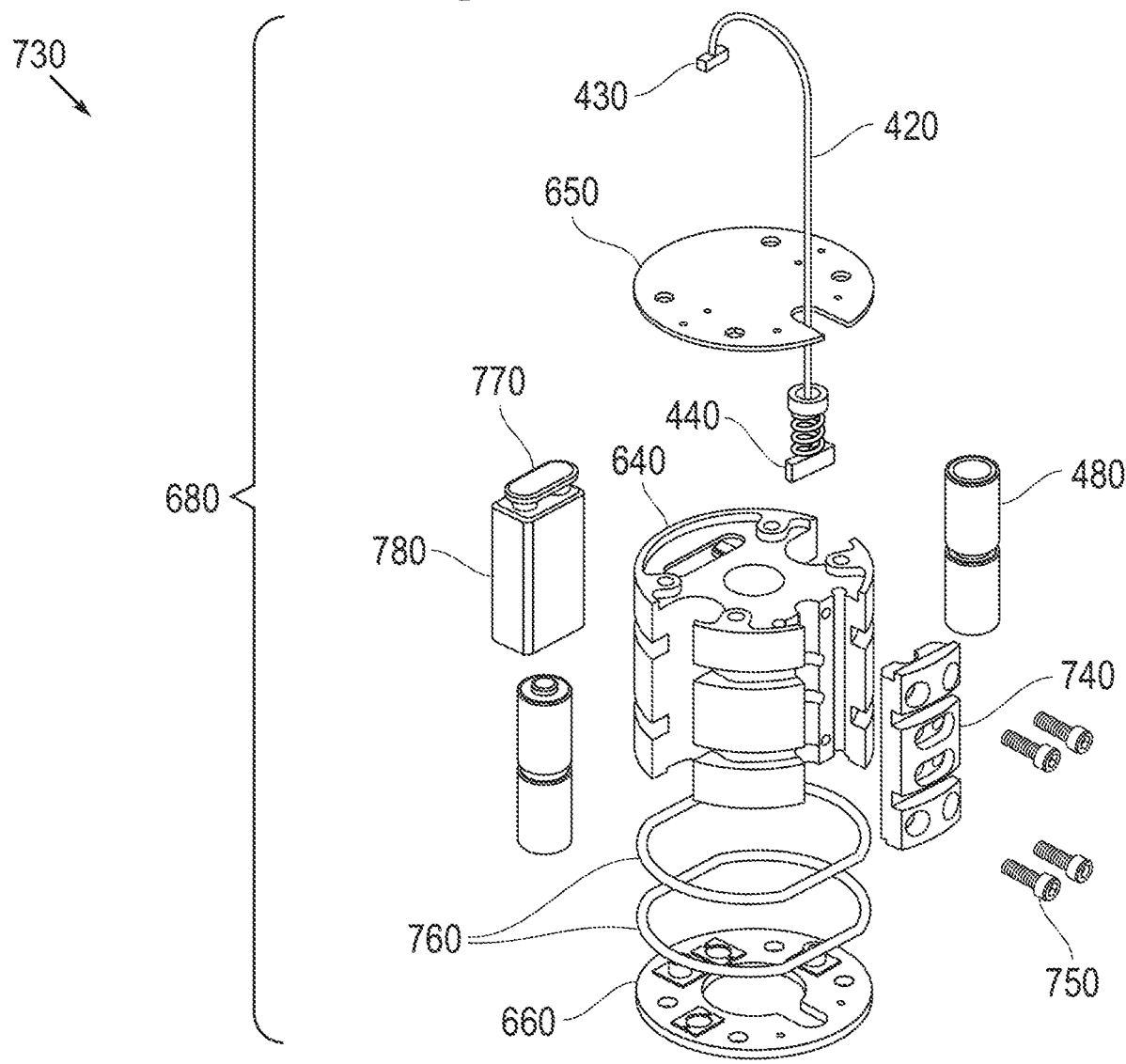

FIG. 7A shows an isometric view 700 of the cage housing 630. At its lid, the cage housing 630 includes holes 710 for the cable loops 310 and holes 720 for the long bolts 520 to pass through. FIG. 7B shows an isometric exploded view 730 of the electronics module 680. The battery retainer 640 includes a removable panel 740 connected thereto by screws 750. A pair of O-rings 760 secure the batteries 480 in their retainer 640. The pigtail wire 420 passes between the retainer 640 and the panel 740. An electrode cap 770 attaches to a 9-volt battery 780, both contained along the internal periphery of the retainer 640.

Figure 8:
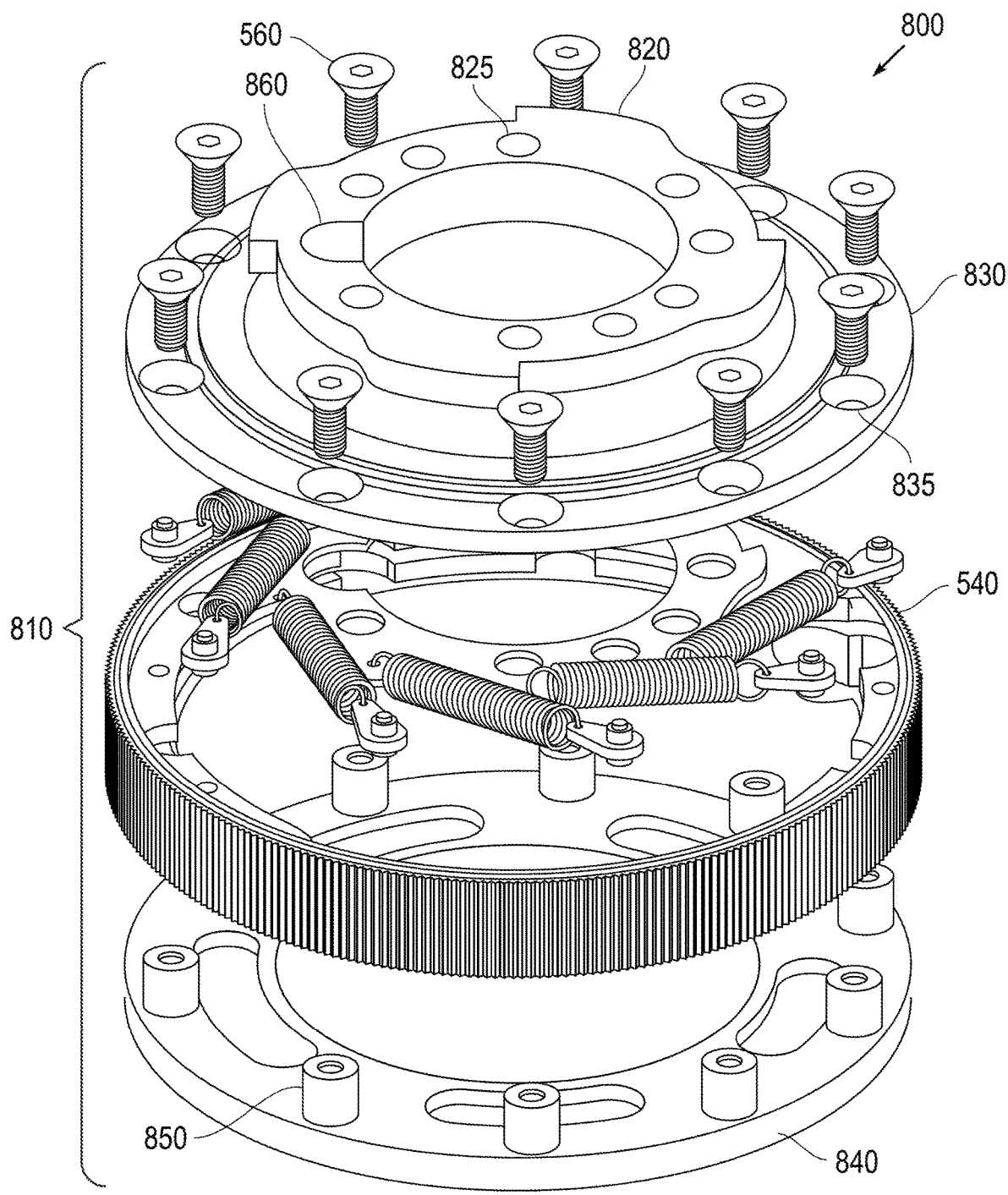
FIG. 8 is an isometric exploded view of a mid-ring portion.

FIG. 8 shows an isometric exploded view 800 of a mezzanine subassembly 810. This includes an anti-over-rotating insertion ring 820 with holes 825, a fore plate 830 with holes 835, the edge ring 540 and an aft plate 840. The edge ring 540 is disposed between the fore and aft plates 830 and 840. The flat-head screws 550 insert into the holes 835 of fore plate 830 past the edge ring 540 and into studs 850 on the periphery of the aft plate 840 to connect the subassembly 810 together. The insertion ring 820 also features a horseshoe notch 860 for to enable the pigtail wire 420 to pass through.

FIG. 8 shows an isometric exploded view 800 of a mezzanine subassembly 810. This includes an anti-over-rotating insertion ring 820 with holes 825, a fore plate 830 with holes 835, the edge ring 540 and an aft plate 840. The edge ring 540 is disposed between the fore and aft plates 830 and 840. The flat-head screws 550 insert into the holes 835 of fore plate 830 past the edge ring 540 and into studs 850 on the periphery of the aft plate 840 to connect the subassembly 810 together. The insertion ring 820 includes a horseshoe notch 860.

A compression module 940 includes the annular housing 550. An anti-dropdown stop 945 is disposed between the compression module 940 and a grip module 950. Shown disassembled, the grip module 950 includes interleaving wedges 960 aligned to the annular housing 550 by axial pins 965, and adjacent latches 970, each primarily comprising a claw 470. The wedges 960 couple to their adjacent claws 470. An outer plurality of spheres 980 as outer ball bearings are contained within the housing 550. An inner plurality of spheres 985 as inner ball bearings is annularly disposed between annular races (shown in FIGS. 10B and 16B) to roll around between the thrust bearing 910 and the fore plate 830. The thrust bearing 910, insertion ring 820, lock ring 920, torsion set 930 and compression module 940 together denote a bearing section 990.

Figure 10A:
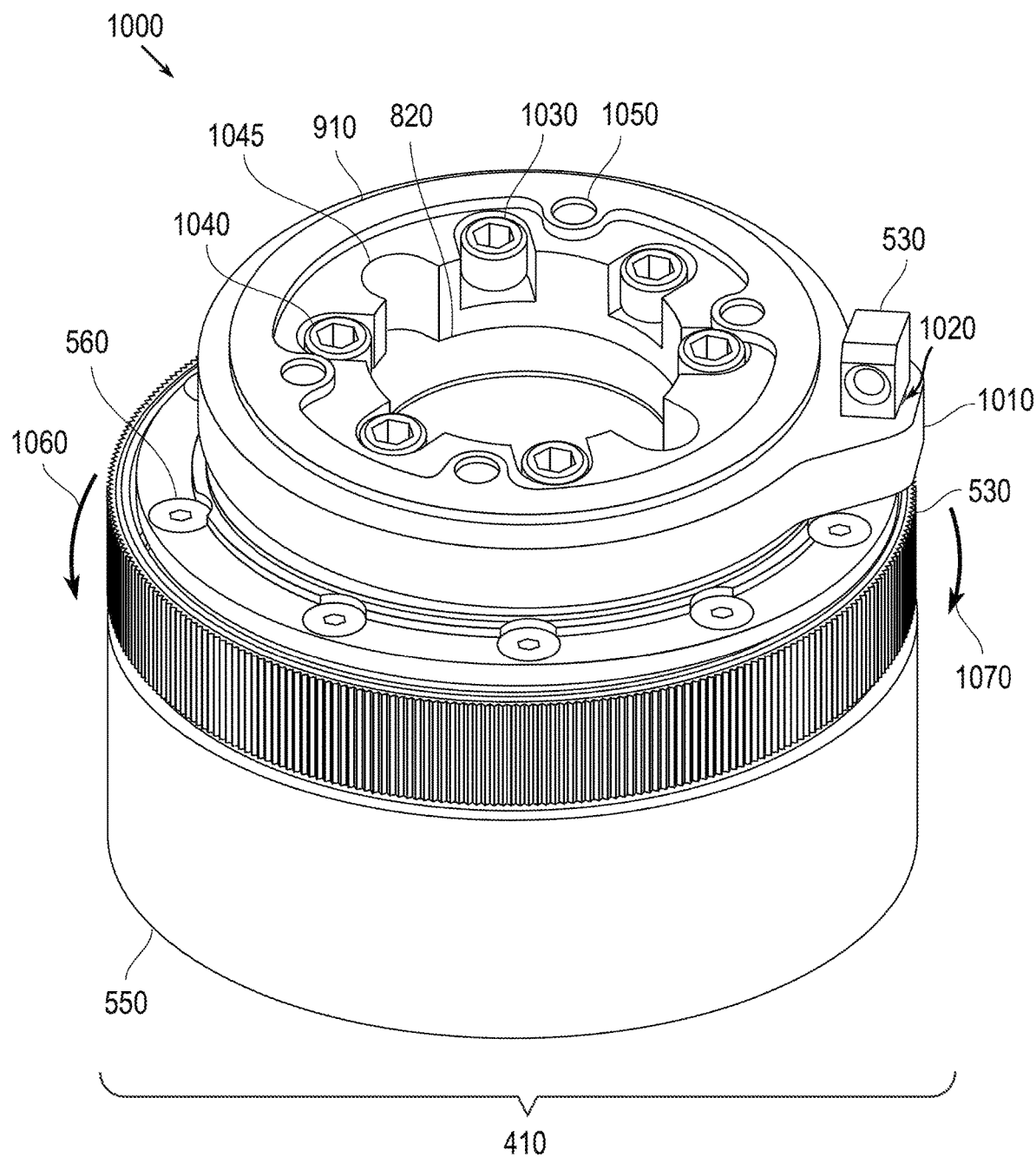
FIGS. 10A and 10B show isometric assembly and component views of the aft section.
Figure 10B:
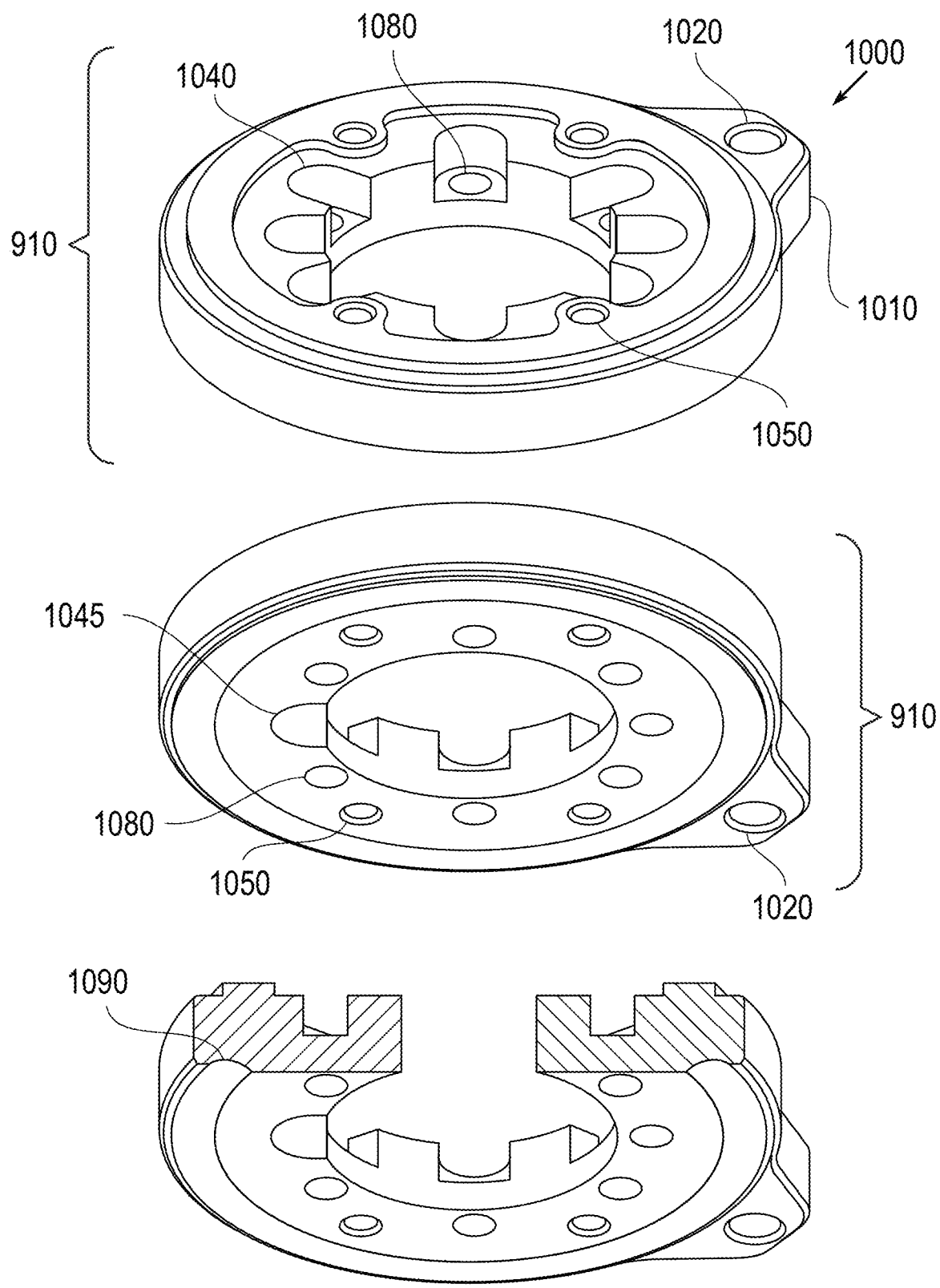
Figure 11A:
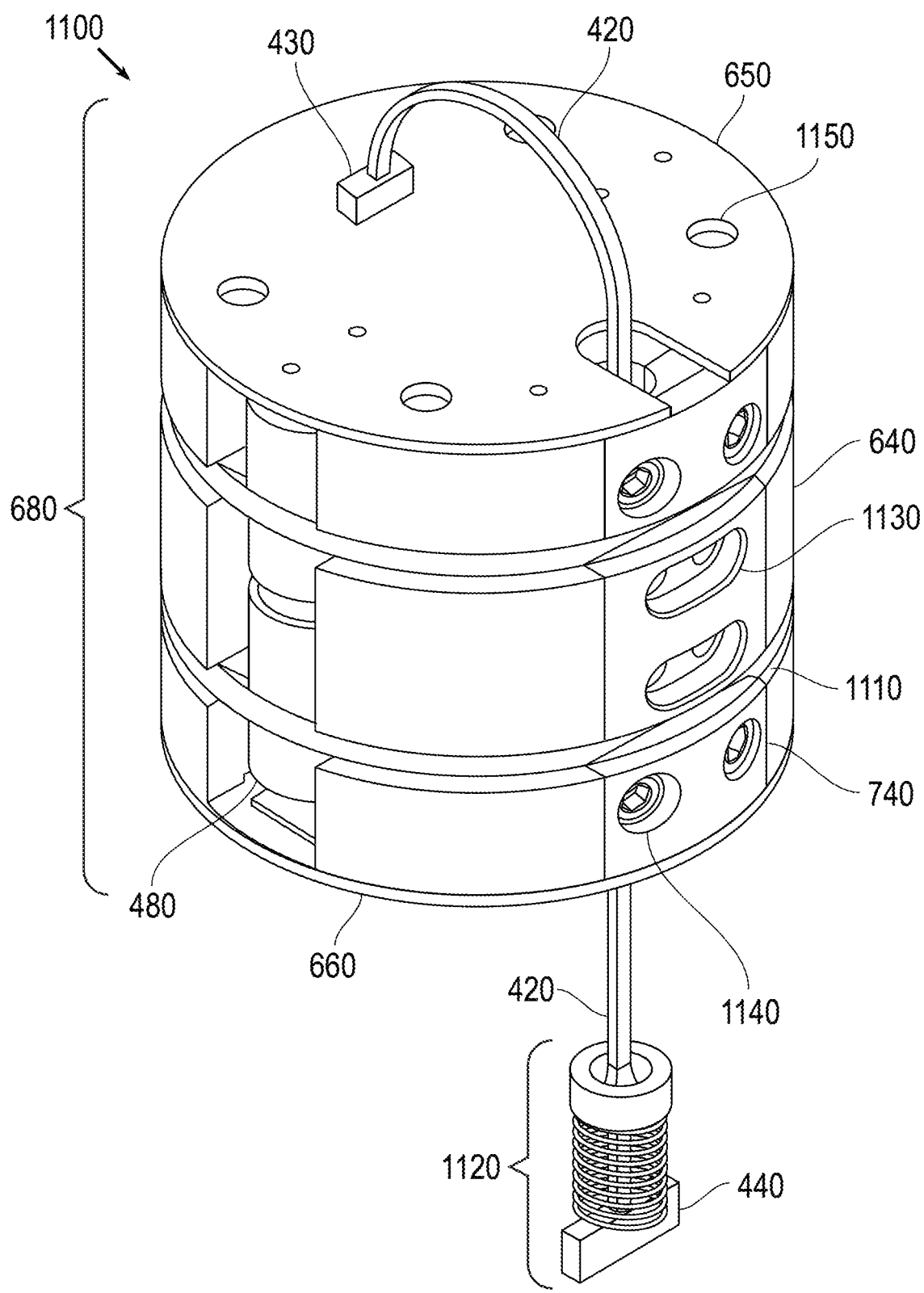

FIGS. 10A and 10B show isometric assembly views 1000 of the mechanical assembly 410 and the thrust bearing 910, respectively. The mechanical assembly 410 in FIG. 10A comprises the insertion ring 820, thrust bearing 910, lock ring 920, torsion set 930, compression module 940 and grip module 950. The thrust bearing 910 includes a radial protrusion 1010. The release pin 530 inserts into a through-hole 1020 in the protrusion 1010 and passes through the lock ring 920 and into a hole in annual housing 550 (shown in FIG. 12) to secure the lock ring 920 in the locked position, and thereby prevents detachment of the grip module 950 from the boss 460 on the sabot 360. Hex-nut threaded hex bolts 1030 insert into holes 1080 at the cutouts 1040 of the thrust bearing 910 after passing through holes 825 of the insertion ring 820. These 10-32 hex bolts 1030 secure the thrust bearing 910 to the annular housing 550 within cutouts 1040. A horseshoe notch 1045 creates space for the pigtail wire 420 to pass through. The long bolts 520 attach the thrust bearing 910 to the electronics module 680 through a series of 10-32 tapped through-holes 1050.

FIGS. 10A and 10B show isometric assembly views 1000 of the mechanical assembly 410 and its components, which comprise the insertion ring 820, thrust bearing 910, lock ring 920, torsion set 930, compression module 940 and grip assembly 950. The thrust bearing 910 includes a radial protrusion 1010. The release pin 530 inserts into a through-hole 1020 in the protrusion 1010 and passes through the lock ring 920 and into a hole in annual housing 550 (shown in FIG. 12) to secure the lock ring 920 in the locked position, and thereby prevents detachment of the grip module 950 from the boss 460 on the sabot 360. Hex-nut threaded bolts 1030 insert into cutouts 1040 of the thrust bearing 910 after passing through holes 825 of the insertion ring 820. These 10-32 hex bolts 1030 secure the thrust bearing 910 to the annular housing 550 within cutouts 1040. Adjacent horseshoe notchs 1045 are angularly disposed between pairs of cutouts 1040. The long bolts 520 attach the thrust bearing 910 to the electronics module 680 through a series of 10-32 tapped through-holes 1050.

FIGS. 11A, 11B, 110 and 11D show isometric assembly views 1100 of the electronics module 680 or portions thereof. Upper and lower O-ring annular grooves 1110 in the battery retainer 640 enable the O-rings 760 to firmly retain the batteries 480 and 780 during operations. A compression spring 1120 on the pigtail wire 420 at its distal end provides slight positive pressure to the aft nano-d connector 440 while attached to mating receptacle 450 rigidly mounted on the sabot assembly 360. While the article 160 attaches to the sabot assembly 360, compression from the spring 1120 mitigates against forces during operations that could cause the aft connector 440 and the receptacle 450 to separate.

On the proximal end of the pigtail wire 420, the fore connector 430 on the fore circuit board 650 is protected during operations by the zip-ties 490. The batteries 480 and 780 in the retainer 640 provide direct current power to the article 160 through the fore and aft circuit boards 650 and 660, thereby extending life of the round 150 as a test asset. The zip-ties 490 pass through U-turn holes 1130 in the panel 740 and the retainer 640. Lateral holes 1140 enable screws 750 to pass through to secure the panel 740 to the retainer 640. The long bolts 520 pass through holes 1150 of the fore circuit board 650 (and analogous holes of the aft circuit board 660) as well as cavities 1160 of the retainer 640, as described for view 600.

Figure 12:
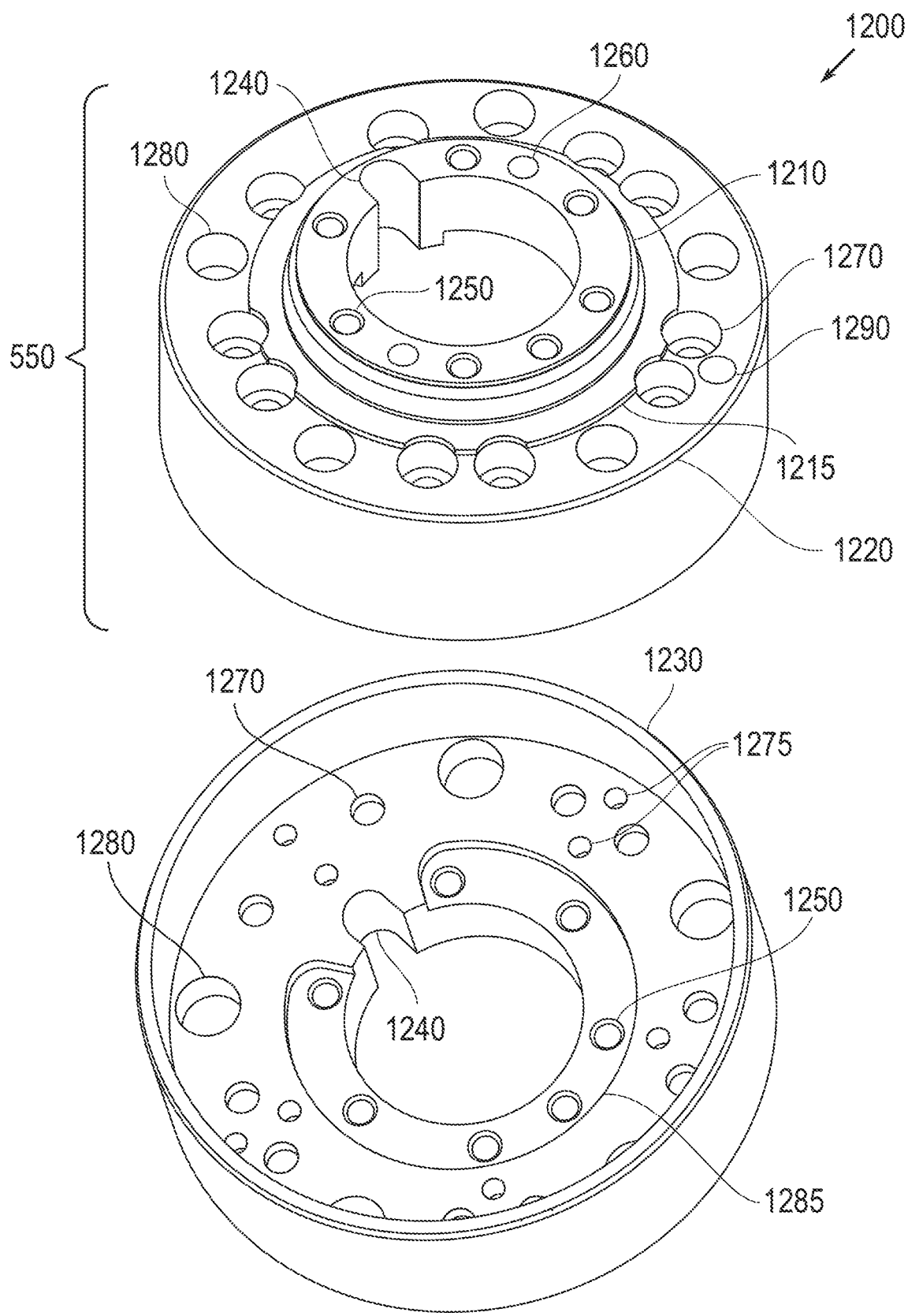
FIG. 12 is an isometric assembly view of an annular housing.
Figure 13:
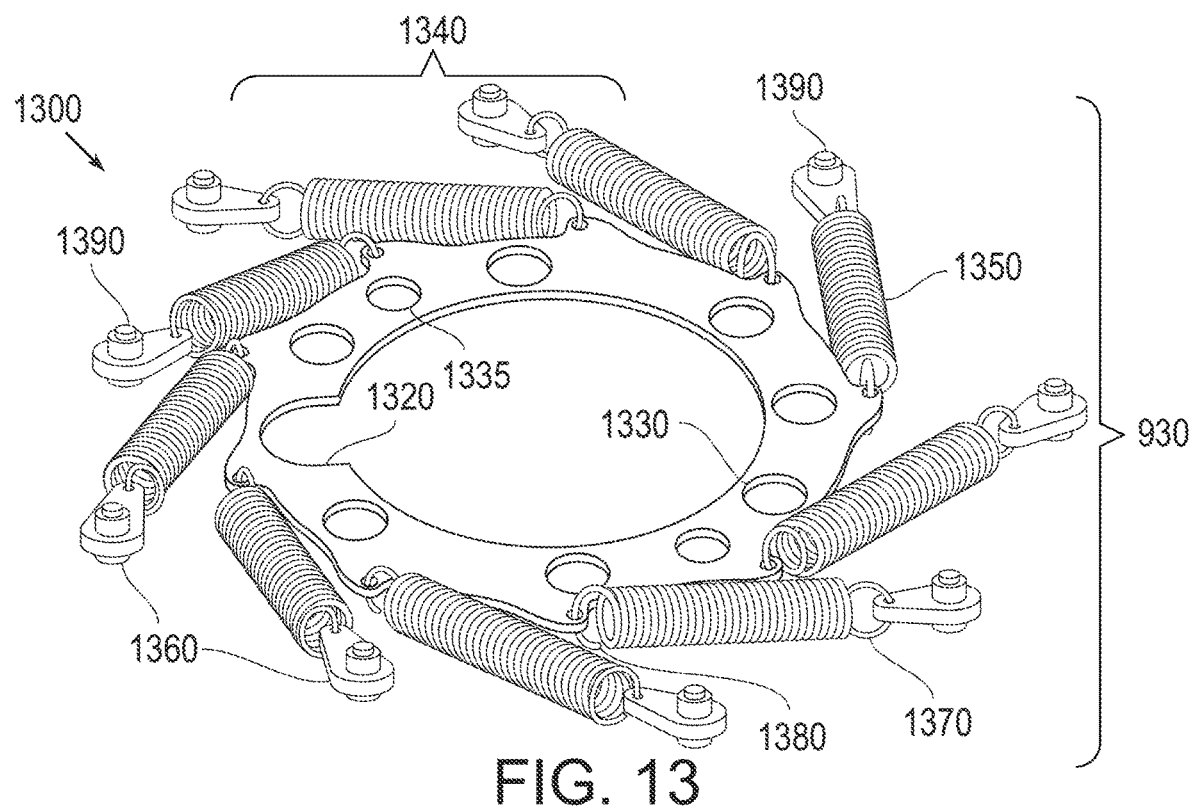
FIG. 13 is an isometric assembly view of a torsion set.
Figure 14:
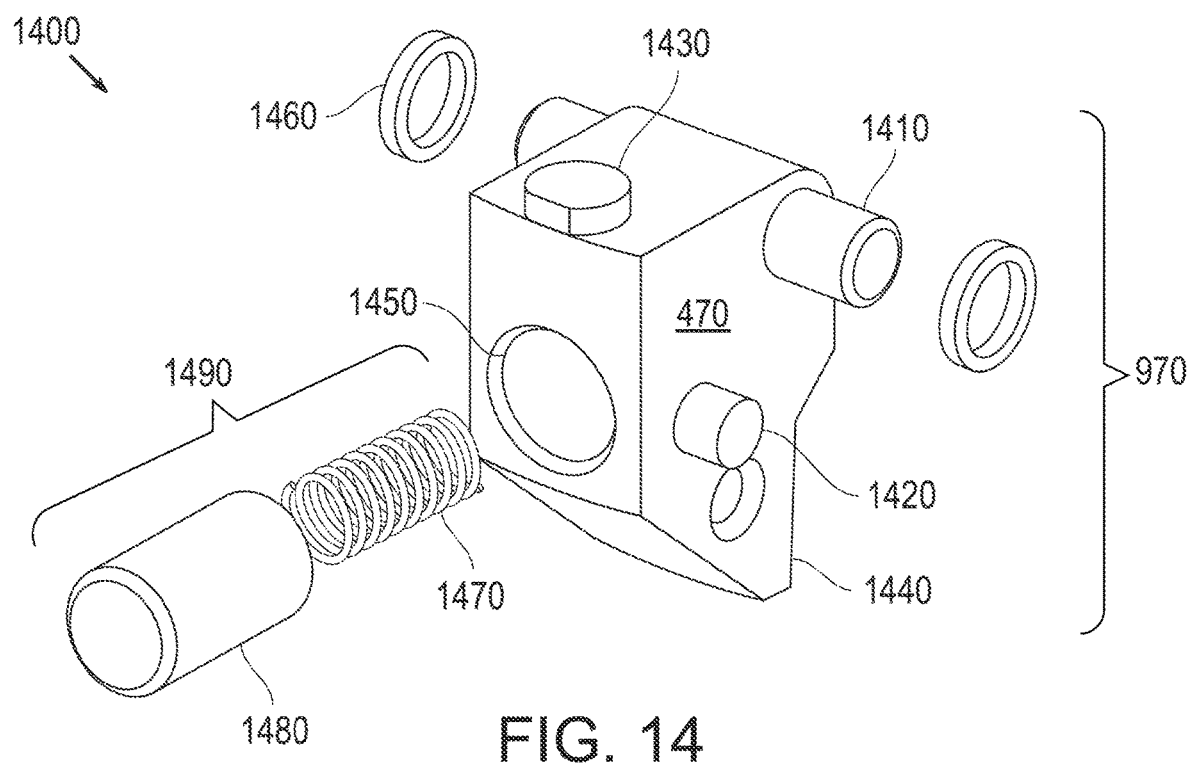
FIG. 14 is an isometric assembly view of a claw module.

FIG. 12 shows isometric component views 1200 of the annular housing 550 from obverse and reverse perspectives. The housing 550 comprises an axially protruding lip 1210, a friction ledge 1215, an annular ledge 1220, and an annular skirt 1230. The lip 1210 includes a radially extending horseshoe-shaped notch 1240 to receive the pigtail wire 420, as well as angularly distributed holes 1250 to receive hex bolts 1030 and a pair of holes 1260 to receive alignment posts (shown in FIG. 19C). Several bolt-receiving holes 1270 are angularly distributed along the perimeter 1215. The underside reveals five pairs of radially arranged alignment holes 1275 on the ledge 1220 angularly interspersed by five stop-pocket cavities 1280. The alignment holes 1275 receive axial pins 965 in their wedges 960. The cavities 1280 receive outer bearing spheres 980. Shown on the underside, a horseshoe channel 1285 provides a space for the anti-dropdown slot 945 to be disposed—sandwiched between the housing 550 and the grip module 950. The ledge 1220 further includes a peripheral hole 1290 to receive the release pin 530.

FIG. 12 shows an isometric component view 1200 of the annular housing 550, which comprises an axially protruding lip 1210, a friction ledge 1215, an annular ledge 1220, and an annular skirt 1230. The lip 1210 includes a radially extending horseshoe-shaped notch 1240, as well as angularly distributed holes 1250 to receive hex bolts 1030 and a pair of holes 1260 to receive alignment posts (shown in FIG. 19C). Several bolt-receiving holes 1270 are angularly distributed along the perimeter 1215. The ledge 1220 includes five pairs of radially arranged alignment holes 1275 angularly interspersed by five stop-pocket cavities 1280. The alignment holes 1275 receive axial pins 965 in their wedges 960. The cavities 1280 receive outer bearing spheres 980. A C-shape cutout 1285 flanks the notch 1240 inside the skirt 1230. The ledge 1220 further includes a peripheral hole 1290 to receive the release pin 530.

A pivot hinge 1410 inserts into the corresponding hole 965 of an adjacent wedge 960. The hinge 1410 is circumferentially lateral and thereby orthogonal to the longitudinal axis in compass rose 210. A balancer knob 1420 enables the claw 470 to restrict rotational pitching by an adjacent wedge 960. A flat ridge 1430 is disposed axially forward of the hinge 1410. The claw 470 includes a jaw tooth 1440 projecting radially inward at the axial tip that engages the boss 460 of the sabot 360. Axially forward of the tooth 1440, the claw 470 includes a radially projecting cavity 1450. Spacer rings 1460 slip over both sides of the pivot hinge 1410 to reduce friction and wobble. A helical spring 1470 inserts into a plunger 1480 to form an engage set 1490, which inserts into the cavity 1450 to impose preloaded tension to pitch the tooth 1440 radially inward (to create gripping tension on the boss 460).

Figure 15A:
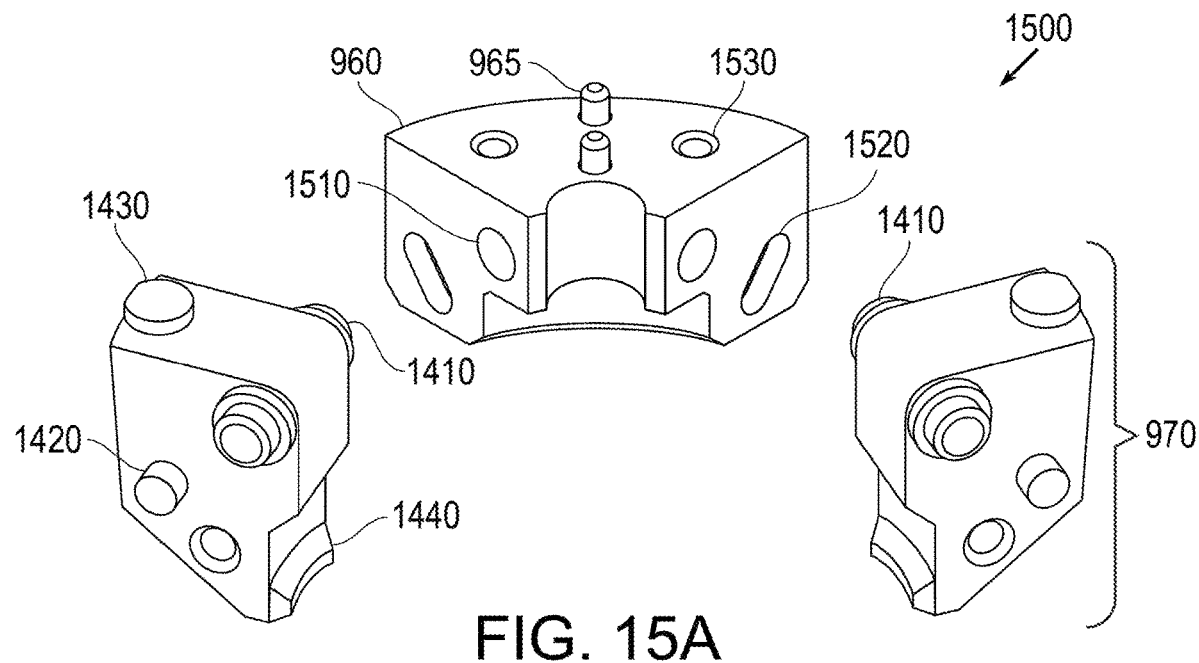
FIGS. 15A and B are isometric assembly view of the grip assembly.
Figure 15B:
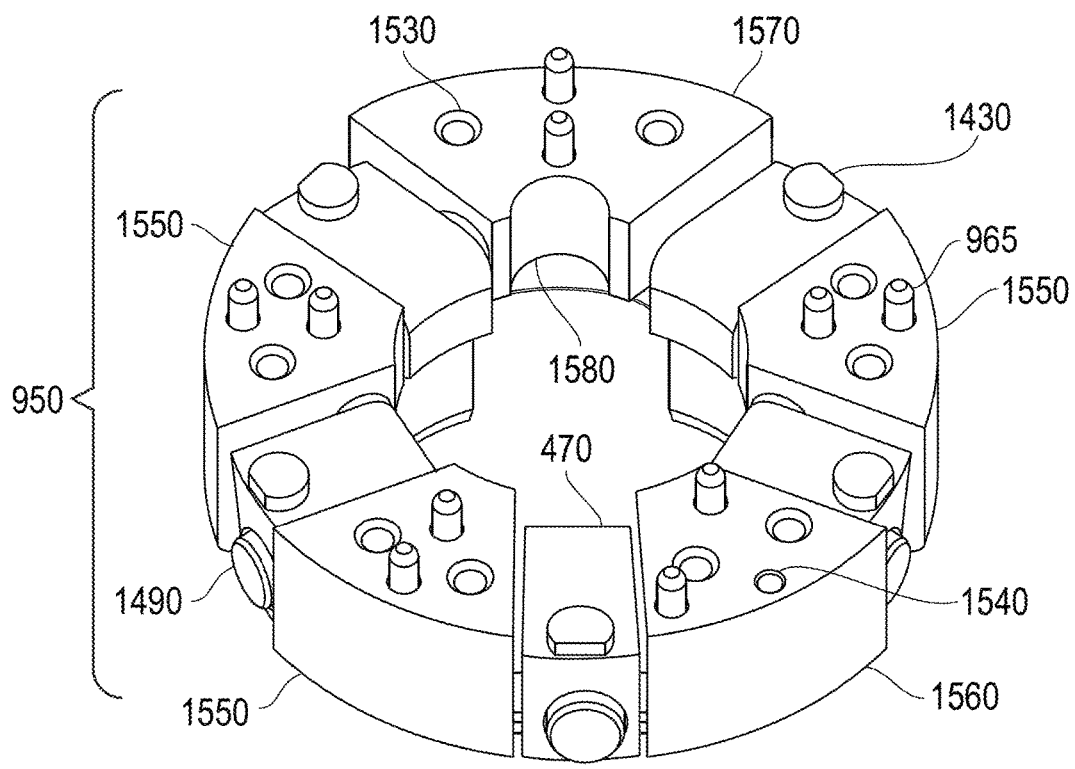

FIGS. 15A and 15B show isometric views 1500 of the wedge 960 and adjacent latches 970. FIG. 15A provides an exploded view, while FIG. 15B provides an assembly view of the grip module 950. Five angularly distributed pairs of wedges 960 and claws 470 are arranged to interconnect by hinges 1410 of each claw 470 contained within their corresponding cavities 1510 of the adjacent wedge 960. The claw 470 rotates along a circumferential axis to radially move the jaw tooth 1440 in (to lock) and out (to release) the boss 460. The knobs 1420 wobble within corresponding kidney-shape cavities 1520 of the adjacent wedges 960 while restricting the angular pitch motion of the claw 470.

The wedges 960 include tap holes 1530 adjacent to positions for the axial pins 965 to inhibit twisting. The pins 965 align to axial holes 1275 on the reverse side of the annular housing 550 and axial holes 1540 on the wedges 960. Note that although the claws 470 are uniform, the five wedges 960 comprise two shapes: four-hole narrow wedge 1550 for three of the wedges 960, six-hole narrow wedge 1560, a wide wedge 1570 with a semicircular horseshoe notch 1580 that aligns with the corresponding notch 1240 of the annular housing 550 to enable the pigtail wire 420 to pass through. Each of these wedge shapes includes the tap holes 1530, axial holes 1540 and lateral cavities 1510 and 1520. The narrow wedges 1550 and 1560 are substantially identical except for additional axial holes 1540 adjacent the lateral sides of the latter.

FIGS. 16A, 16B, 16C and 16D show isometric views 1600 of the insertion ring 820, fore plate 830, edge ring 540 and aft plate 840, respectively. The insertion ring 820 in FIG. 16A includes four radially outward flanges 1605, each having a bevel edge stop 1610 and an abrupt edge stop 1620. The insertion ring 820 also includes peripheral holes 825 to receive hex bolts 1030 and a pair of through-holes 1625. The fore plate 830 in in FIG. 16B includes four radially inward cutouts, each having a bevel edge stop 1630 and an abrupt edge stop 1640. The fore plate 830 also includes an annular aft race 1645 to contain the inner spheres 985. The aft race 1645 is axially aligned with the fore race 1090.

The grip module 950 attaches behind the bearing section 990 to combine as the mechanical assembly 410. The bearing section 990 also joins the fore section 220 ahead. Outer bearing spheres 980 with diameters of 0.375 inch (⅜″) are disposed within stop-pocket cavities 1280 of the annular housing 550 suspended between the cavities 1690 of the aft plate 840 for the lock ring 920 and the protrusion 1430 on the claw 470. Inner bearing spheres 985 with diameters of 0.1875 inch (³⁄₁₆″) are disposed along annular races 1090 and 1645 between the lock ring 920 and the thrust bearing 910.

Edge stops 1610 and 1630 are shaped like cams due to manufacturing cost. The cam shaped configuration is comparatively easy for a computer-driven numerical control machine to manufacture but the straight configuration is much more difficult. The straight configuration requires multiple different cutters and operations to achieve the inside corner with a small radius. The reason that edge stops 1620 and 1640 are shaped like straight lines perpendicular to the center is due to expected impact loads. For the cam configuration, the manufacture cost was prioritized, whereas for the straight configuration the stresses on the metal parts were emphasized for function.

The edge ring 540 in FIG. 16C shows an axial hole 1650 that aligns with the hole 1020 of the thrust bearing 910, and semicircular horseshoe cavities 1660 that align with the cylindrical studs 850 of the aft plate 840 for receiving screws 560. The edge ring 540 also includes peripheral holes 1670 to receive the dowel pins 1390 of the torsion set 930. The aft plate 840 in FIG. 16D is shown from ahead and behind. On the obverse side, the aft plate 840 includes curved elongated channels 1680 surrounded by cylindrical stubs 850 that receive the ten 6-10 flat head screws 560. On the reverse side, the aft plate 840 includes a series of oval cut pockets 1690 into to receive corresponding outer spheres 980. Horseshoe notches 860 on the insertion ring 820, 1045 on the thrust bearing 910, 1240 on the annular housing 550, 1320 on the tension ring 1310 and 1580 on the wide wedge 1570, align with each other to permit the pigtail wire 420 to pass through.

Figure 17A:
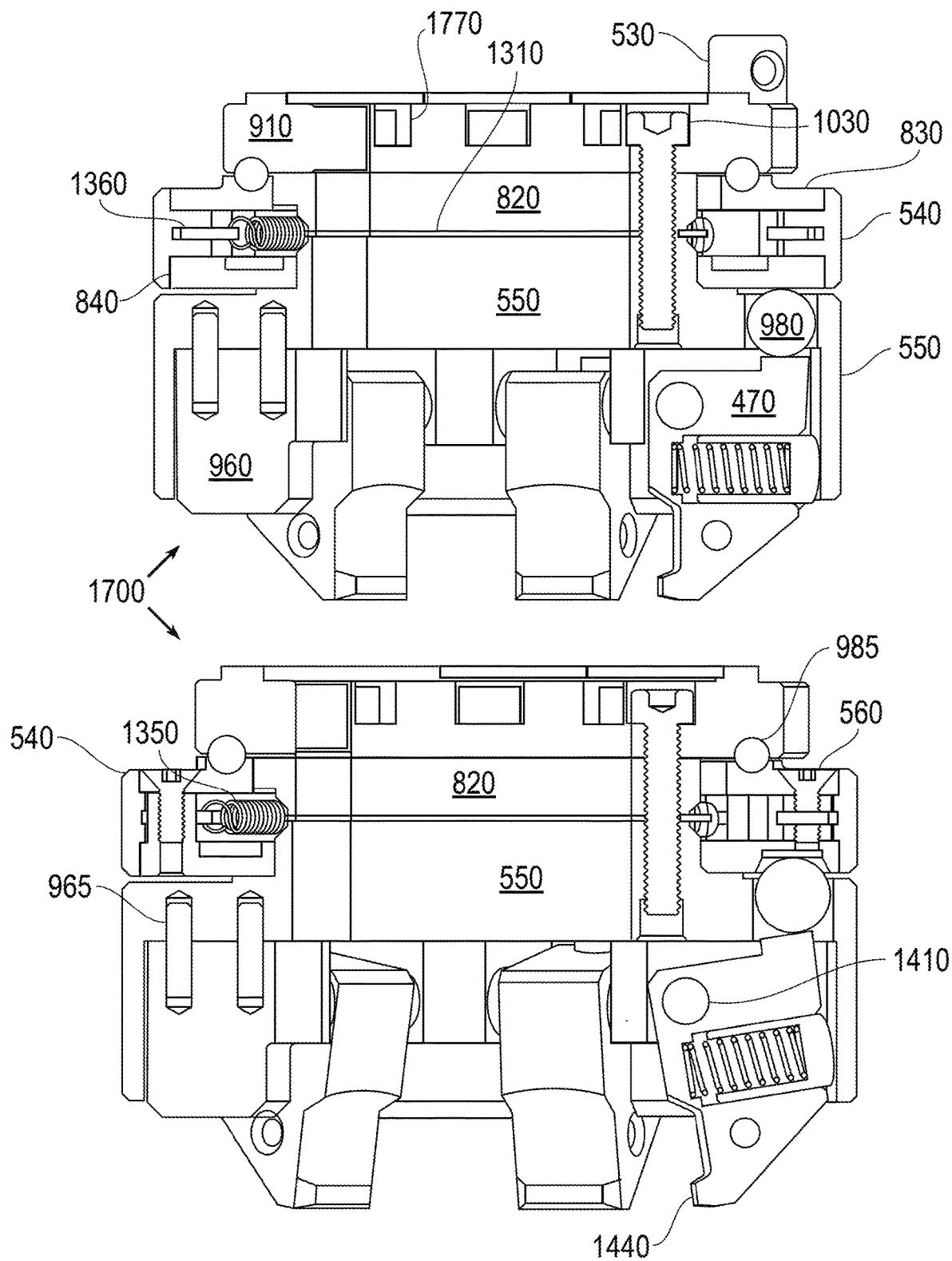
FIGS. 17A, 17B, 17C and 17D are elevation assembly views of the aft section.
Figure 17B:
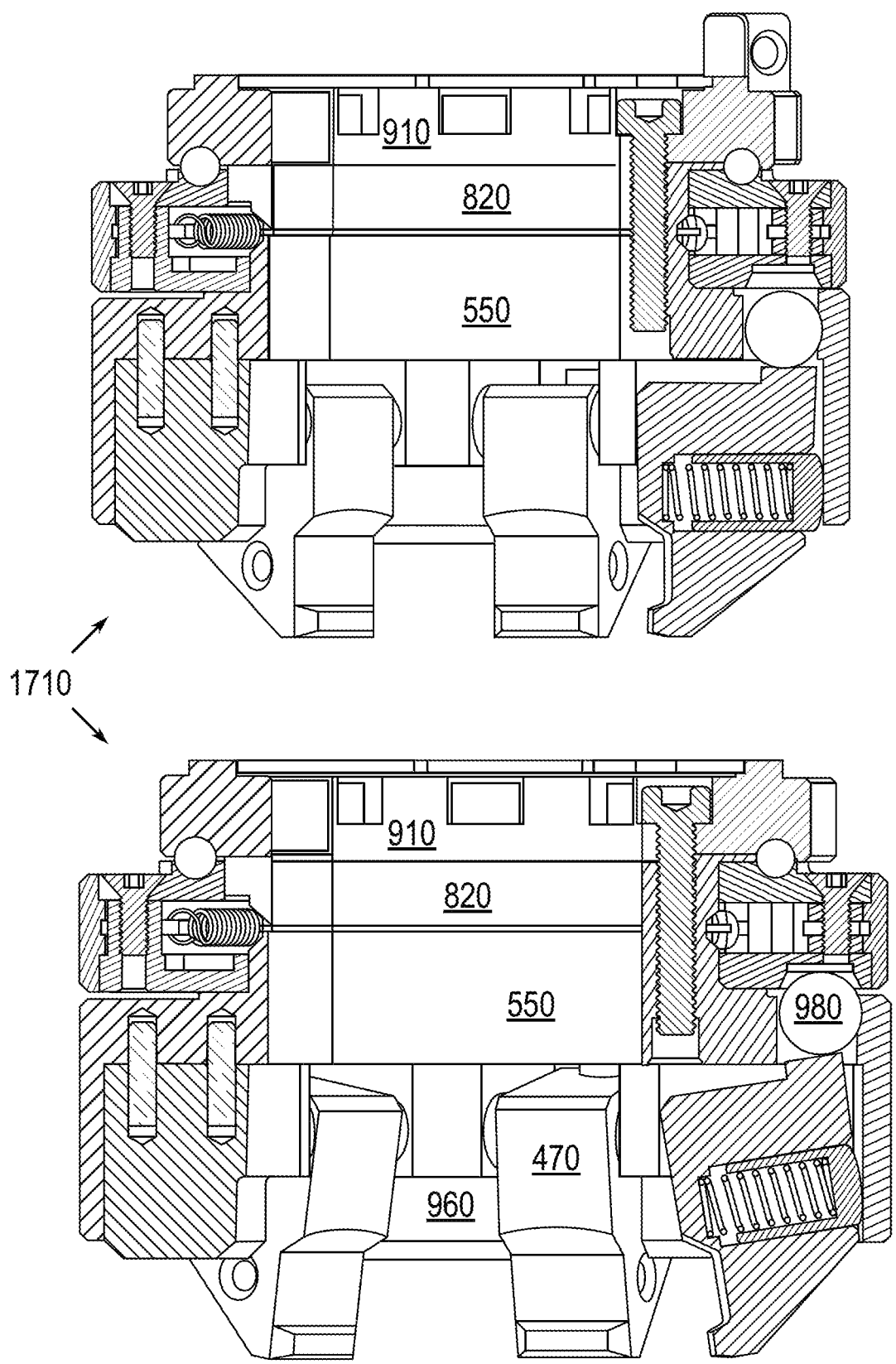
Figure 17C:
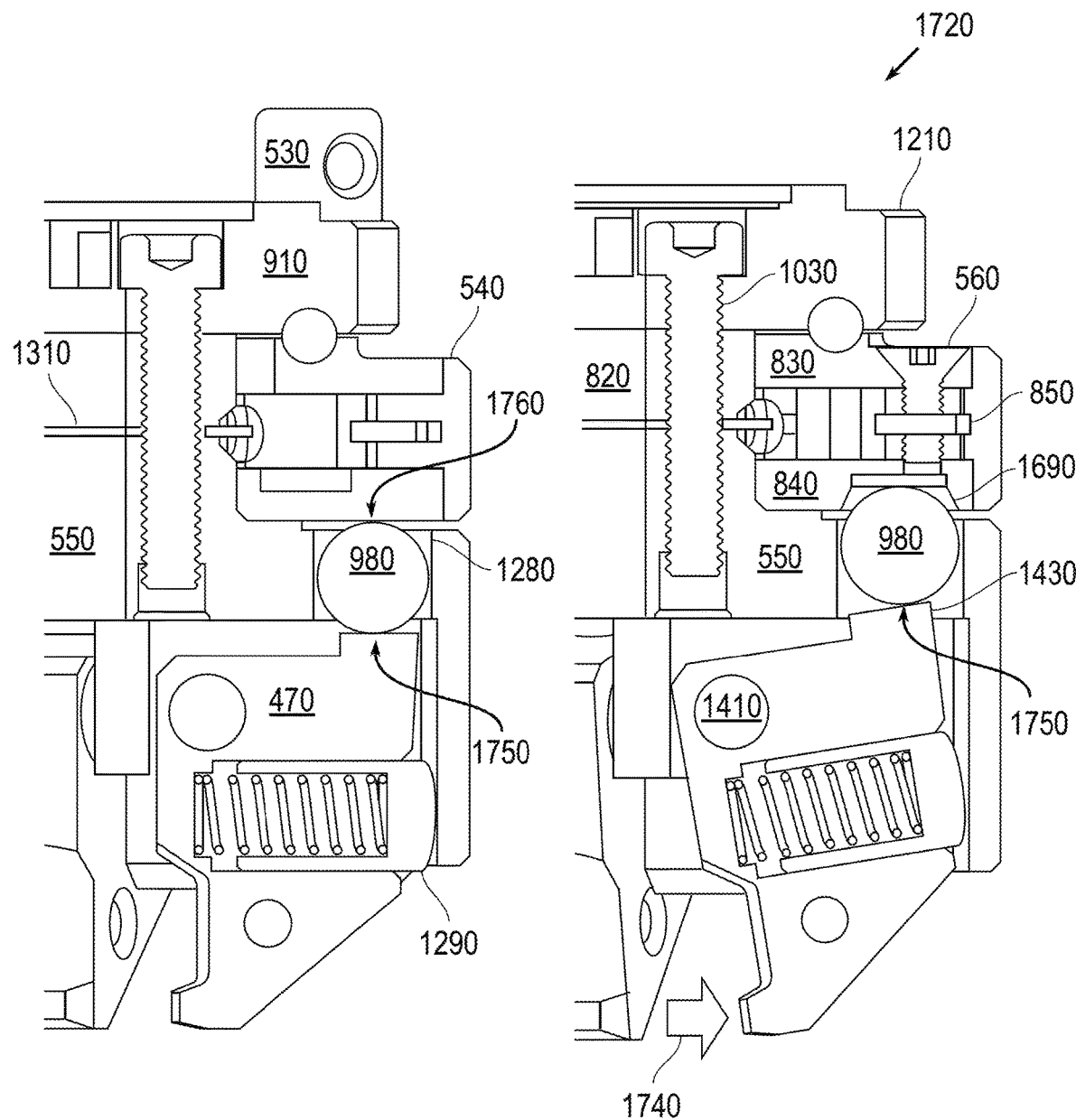
Figure 17D:
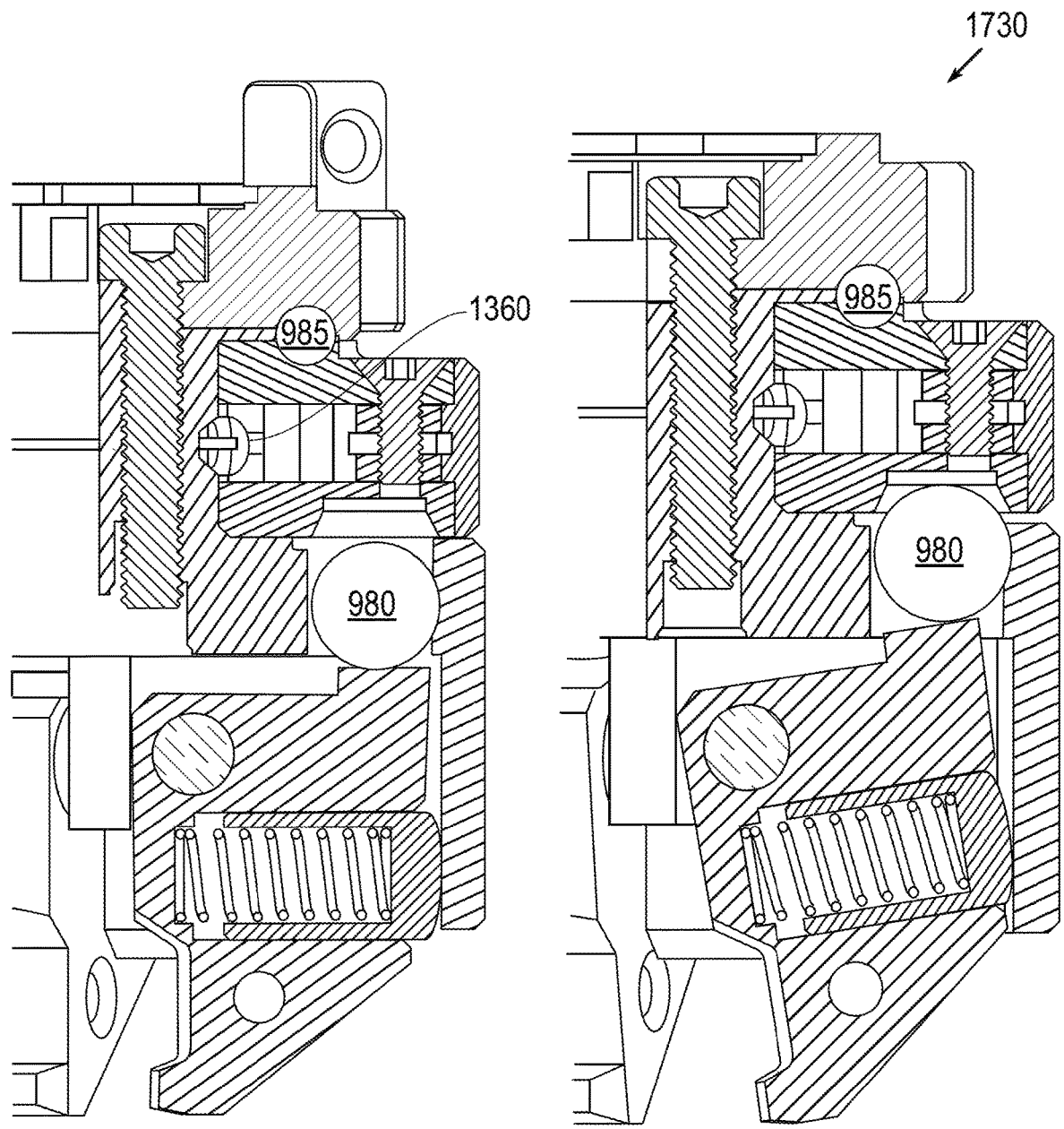

FIG. 17A shows an elevation cross-section view 1700 of the mechanical assembly 410. FIG. 17B shows an elevation cross-section view 1710 of the mechanical assembly 410 with cross-section hashing to indicate cut-through material. FIGS. 17C and 17D respectively show elevation cross-section detail views 1720 and 1730 at the assembly's periphery respectively with and without hashing. The anti-over-rotating insertion ring 820 is axially disposed between the thrust bearing 910 and the annular housing 550. Grappling claws 470 are angularly distributed between the wedges 960 as an interleaving series of five mutual pairs. The anti-dropdown stop 945 is omitted for clarity.

The tandem and adjacent views 1700, 1710, 1720 and 1730 compare the mechanical assembly 410 with claws 470 engaged (upper or left) and retracted (lower or right) in relation to the boss 460. A radial force 1740 applied to each tooth 1440 causes the corresponding claws 470 to turn outward on their hinges 1410. Applied to these rigid claws 470, this action pivots the ridge 1430 to raise the sphere 980 axially forward in its cavity 1280 of the annular housing 550.

View 1720 shows the effect of a malfunction causing force 1740 on the claws 470 when the article 160 unlocks—i.e., when pulling the release pin 530. The force applied at position 1470 on the claws 470 causes them to pivot outward (open) on hinge pin 1410. The pivot motion of the claw 470 is restricted by the lock ring 920. To unlock the article 160, the lock ring 920 must rotate 17° clockwise 1070 so as to position the pockets 1690 of the aft plate 840 above the spheres 980. This provides the spheres 980 corresponding pockets 1690 to enter and enables the claws 470 to rotate to the open position. Typically, there is no issue with the article 160 unlocking. However, as described herein, concerns arose about the article 160 becoming stuck or jammed on the boss 460 of the sabot assembly 360 during the ramming operations. This necessitated a design requirement of the article 160 to unlock the jammed situation.

The exemplary article 160 obviates these concerns by reducing friction on the moving parts to a singular contact point 1760 in this scenario. More specifically, with a constant force 1740 applied at the teeth 1440 on the claws 470, the claws 470 try to pivot open, pinching spheres 980 between contact points 1750 and 1760. The lock ring 920 is best understood here as a solid component, being forced forward into the thrust bearing 910, which is rigidly mounted. The only motion necessary for the article 160 to successfully unlock while jammed is for the lock ring to rotate 17° clockwise 1070.

During the unlocking operation, the lock ring 920 is pushed in the direction of inner spheres 985, this race 1645 of ball bearings enables the top portion of the locking ring 920 and the thrust bearing 910 react like a lazy Susan, which redistributes any friction from a jam to a single isolated point of contact 1760. The reason outer spheres 980 are used instead of plungers 1490 is because ball bearings are extremely hard and have smooth surfaces. In addition, a ball bearing is round so all of the force is being translated to a very small contact point 1760 away from the jam on the lock ring 920. Adding to that, the hole 1280 in the annular housing 550 in which the outer sphere 980 resides, has a loose fit, and this enables the sphere 980 to rotate somewhat, thereby providing another advantage to the lock ring 920.

Figure 18A:
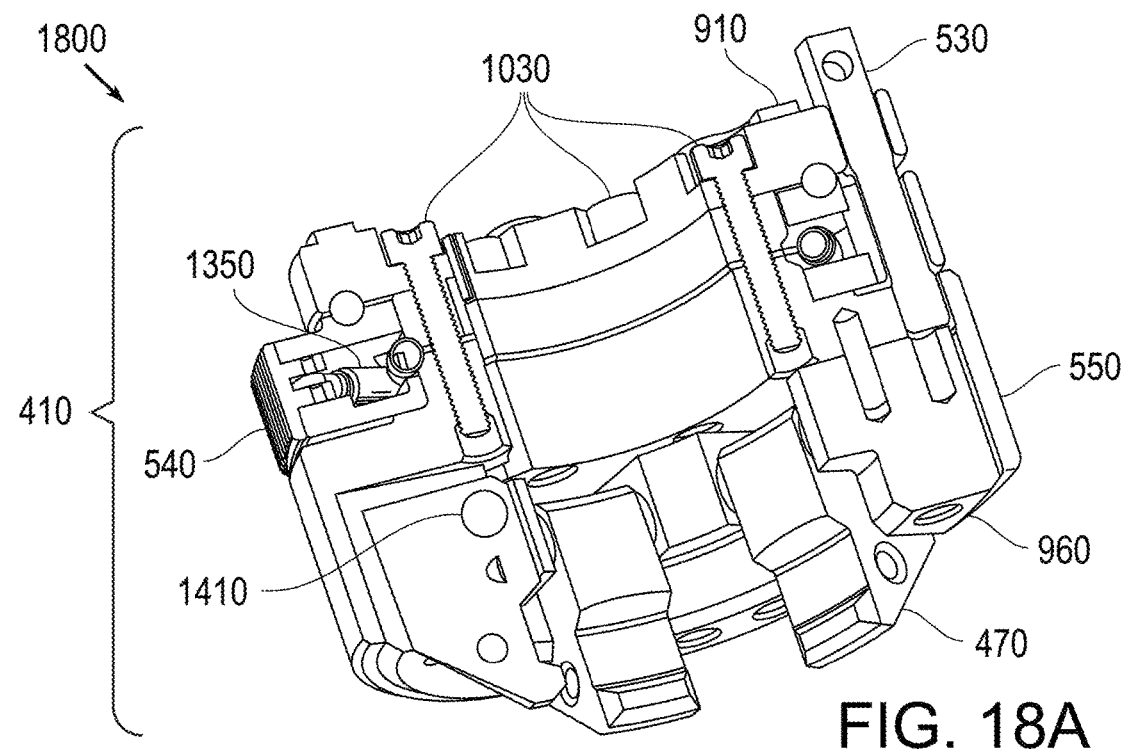
FIGS. 18A and 18B are isometric cross-section and assembly views of the aft section.
Figure 18B:
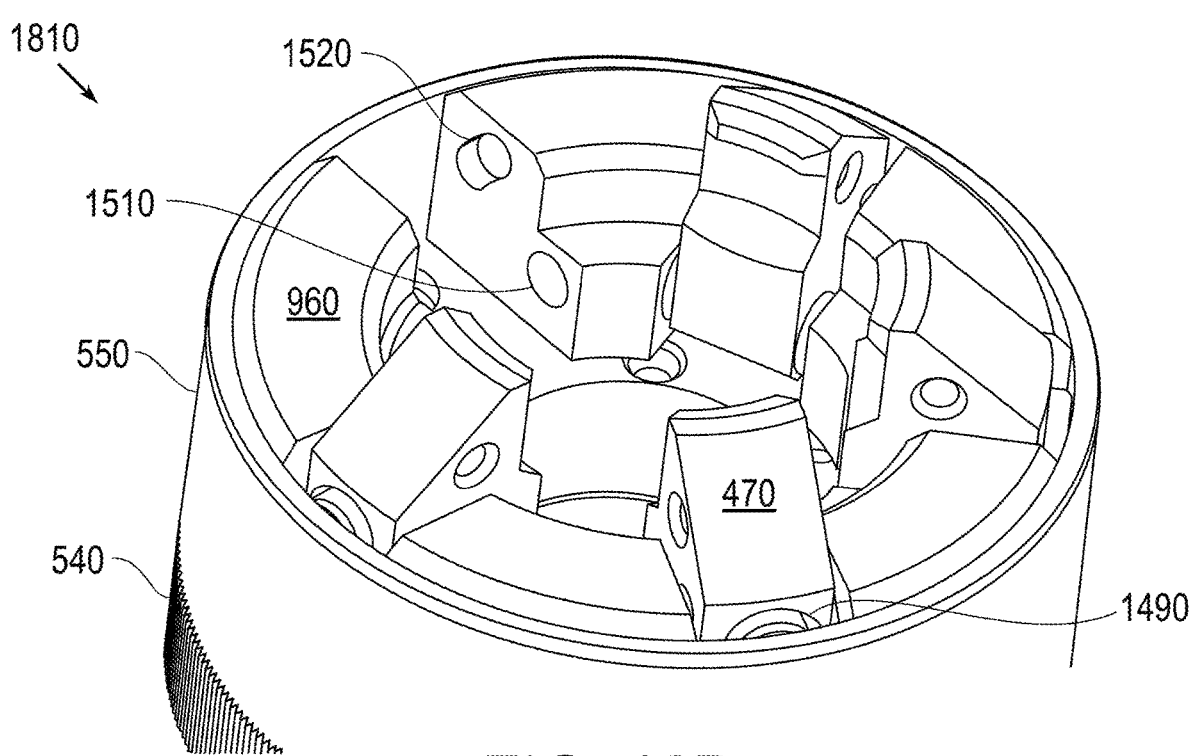

FIG. 18A shows an isometric cross-section view 1800 of the mechanical assembly 410 from behind. This details release pin 530 installed through thrust bearing 910, lock ring 920 and annual housing 550. FIG. 18B shows an isometric assembly detail view 1810 of the edge ring 540 and the annular housing 550 from behind, with one claw 470 of the grip module 950 removed for clarity. This details the anchor point 1510 for hinge 1410, and the kidney-shaped pockets 1520 for restricting motion of the claw 470.

Figure 19A:
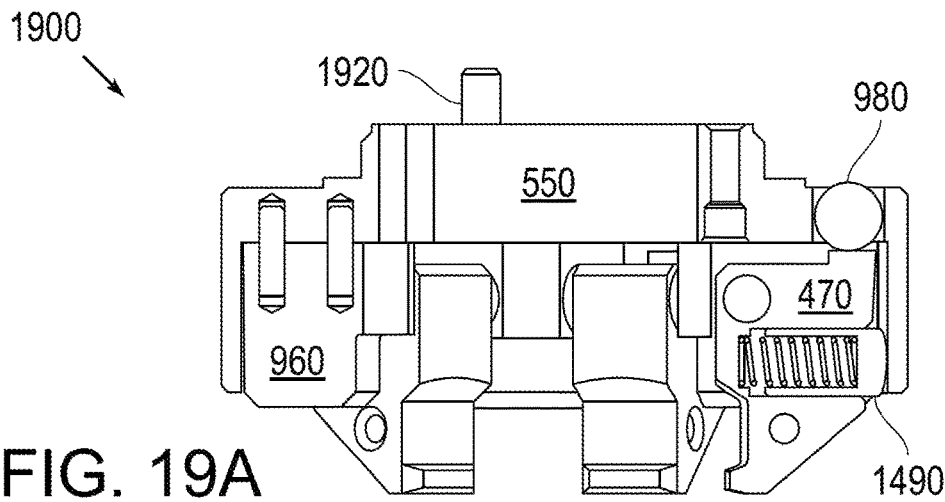
FIGS. 19A and 19B are elevation cross-section views of the aft section.
Figure 19B:
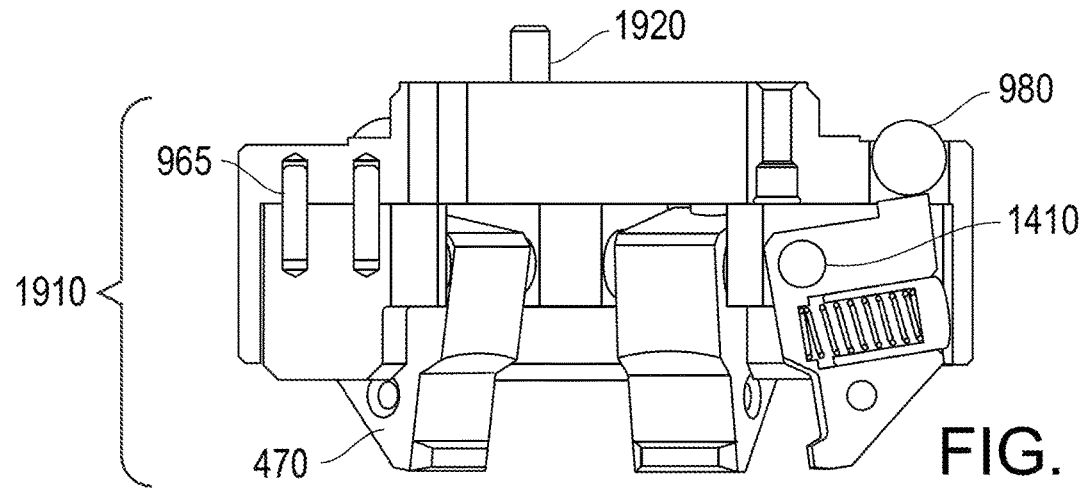
Figure 19C:
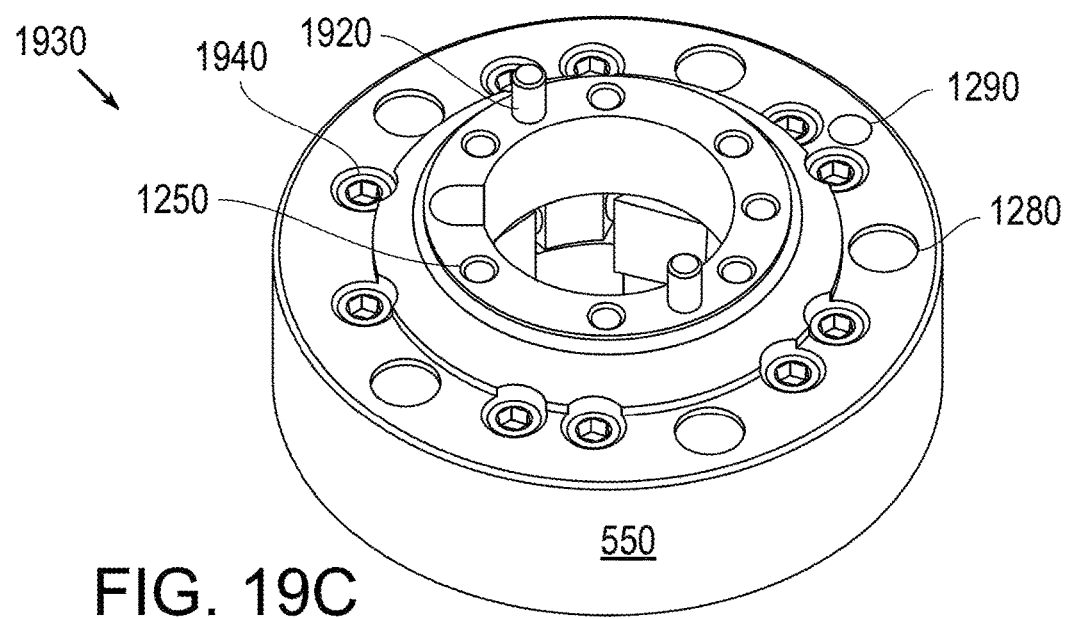
FIG. 19C is an isometric view of the aft section.

FIGS. 19A and 19B show elevation cross-section views 1900 of the compression and grip modules 940 and 950 combined as a rear module 1910 in the aft section 240. Axial posts 1920 within holes 1260 of the annular housing 550 locate torsion set 930 and the anti-over rotating insertion ring 820. FIG. 19C shows an isometric assembly view 1930 of the rear module 1910 absent the outer ball bearings 980 within their cavities 1280. Hex bolts 1940 insert into the annularly distributed holes 1270 to axially secure the annular housing 550 from its reverse side to the separate wedges 960.

Figure 20A:
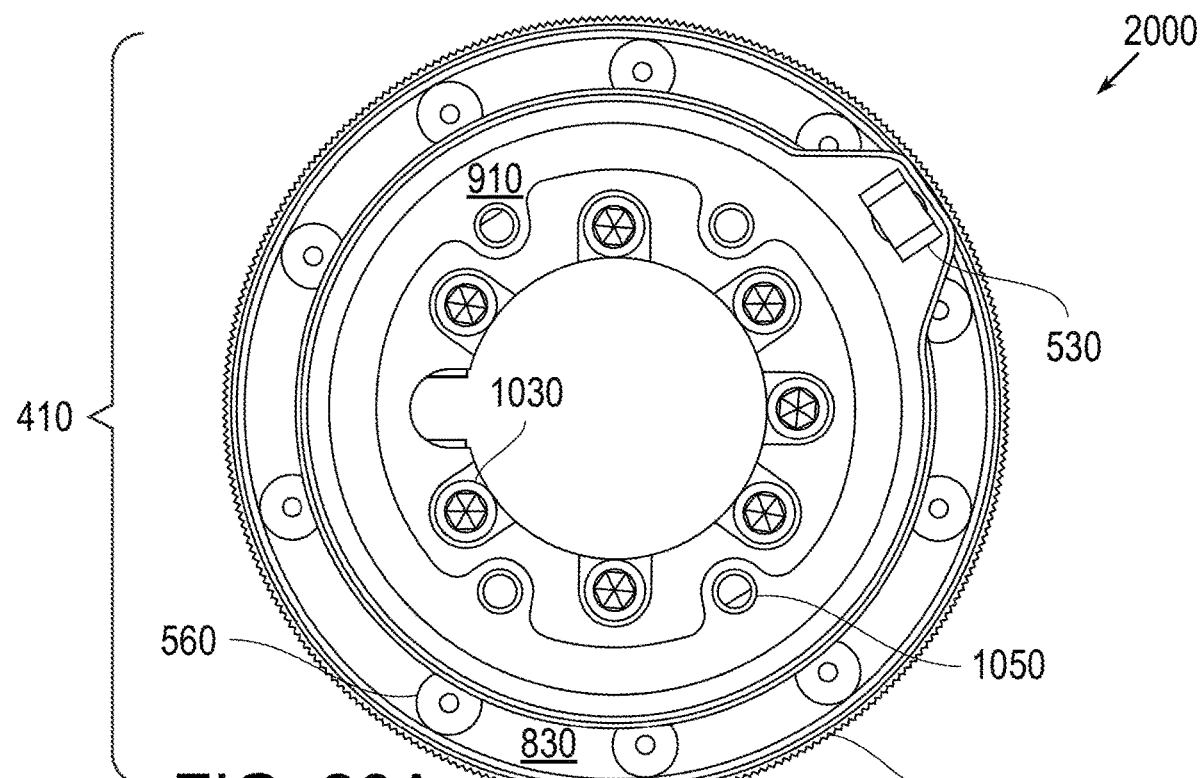
Figure 20B:
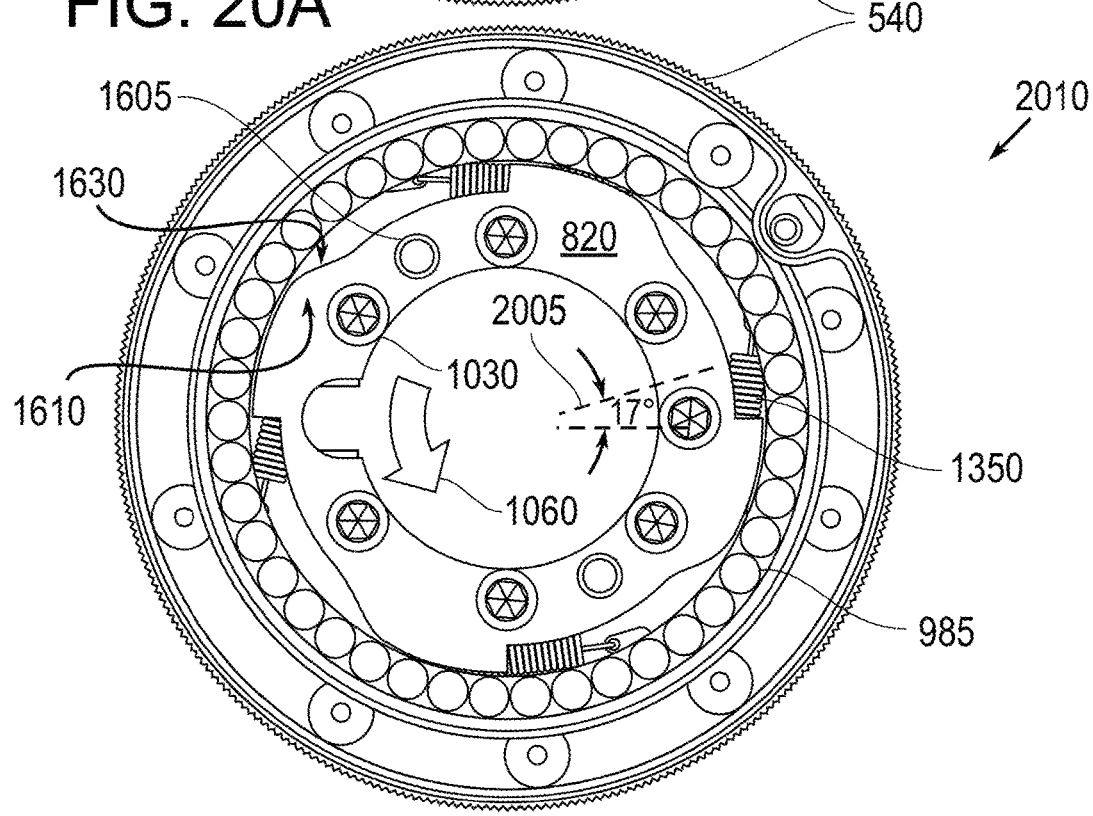
Figure 20C:
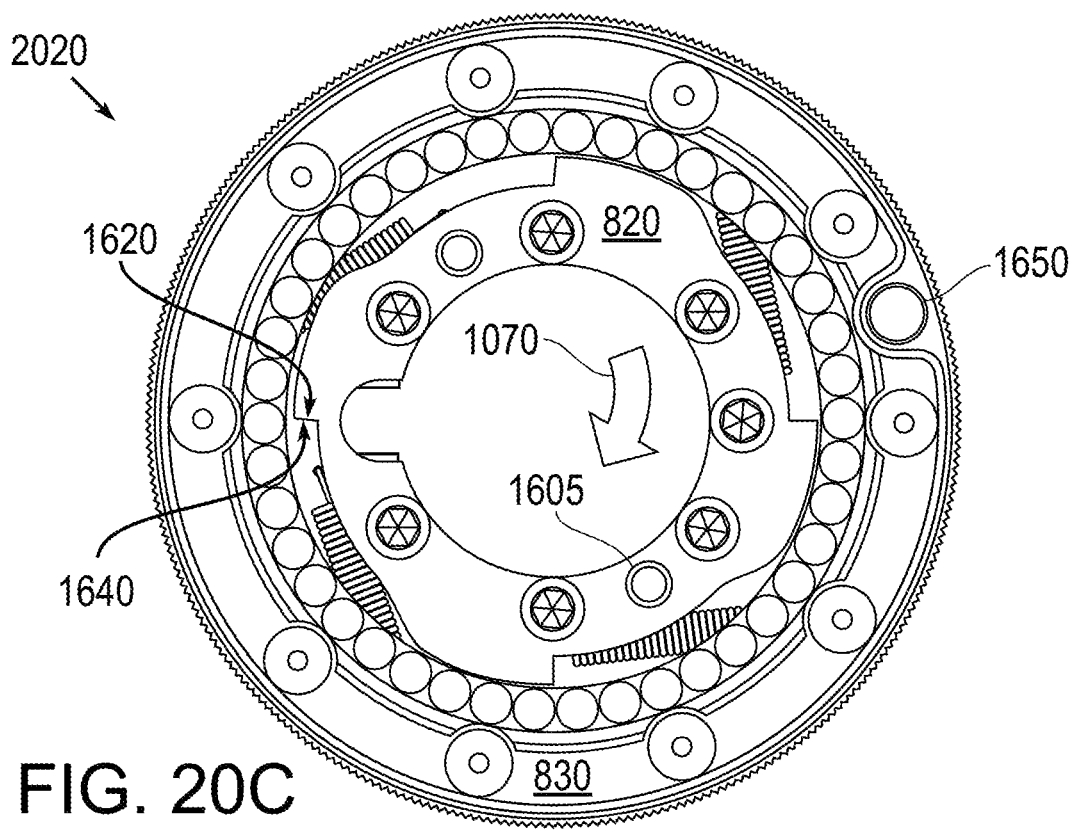

FIG. 20A shows a plan view 2000 of the mechanical assembly 410 with the release mechanism 250. Note that the lock ring 920 turns 17° along the axis shown by angle 2005 in FIG. 20B that shows a plan view 2010 of the aft section with the thrust bearing 910 and the release pin 530 absent, thereby exposing the insertion ring 820, and rotating the lock ring 920 anti-clockwise 1060 to the locked position. FIG. 20C shows a plan view 2020 of the aft section 240 with the thrust bearing 910 absent and the release pin 530 removed, the lock ring 920 rotated clockwise 1070 to the unlocked position, with the insertion ring 820 exposed.

Views 2010 and 2020 illustrate the edge ring 540 as rotated respectively anti-clockwise 1060 and clockwise 1070. In view 2010, the bevel edges 1610 and 1630 of the respective insertion ring 820 and the fore plate 830 abut each other at four angularly distributed locations after the clockwise 1070 turn to enable installation of the release pin 530 and restrict axial movement. In view 2020, the abrupt edges 1620 and 1640 of the respective insertion ring 820 and the fore plate 830 abut each other at four angularly distributed locations after the release pin 530 is absent and the lock ring 920 rotates clockwise 1070.

Figure 20D:
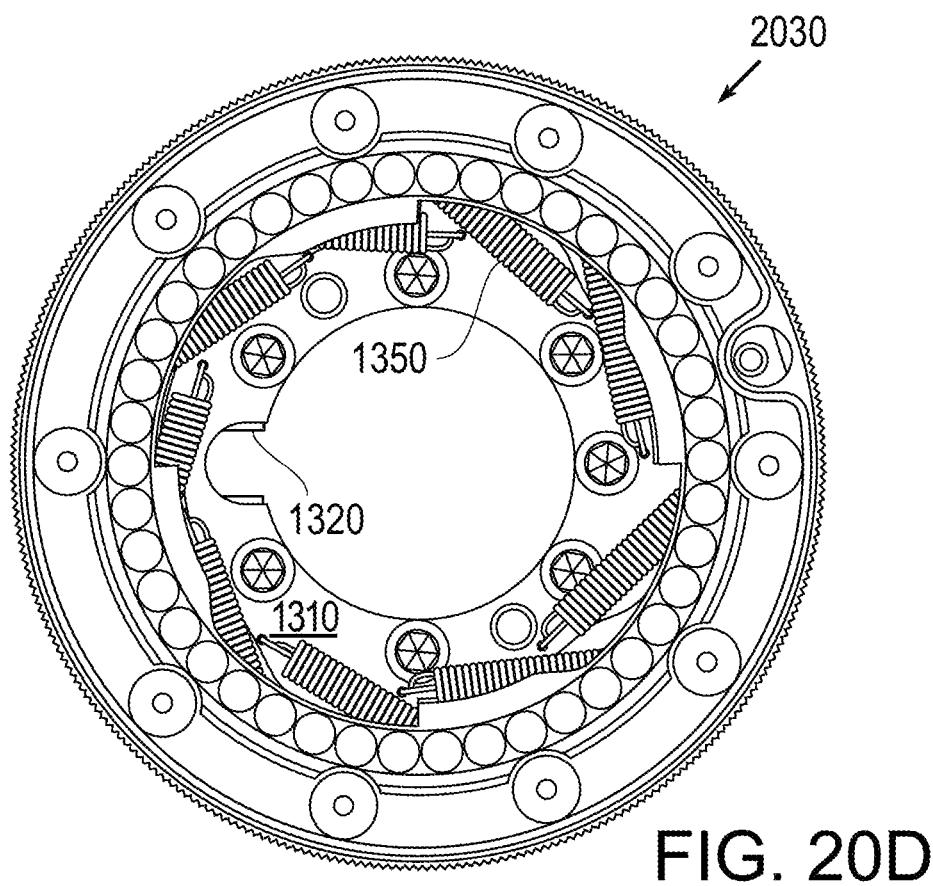
Figure 20E:
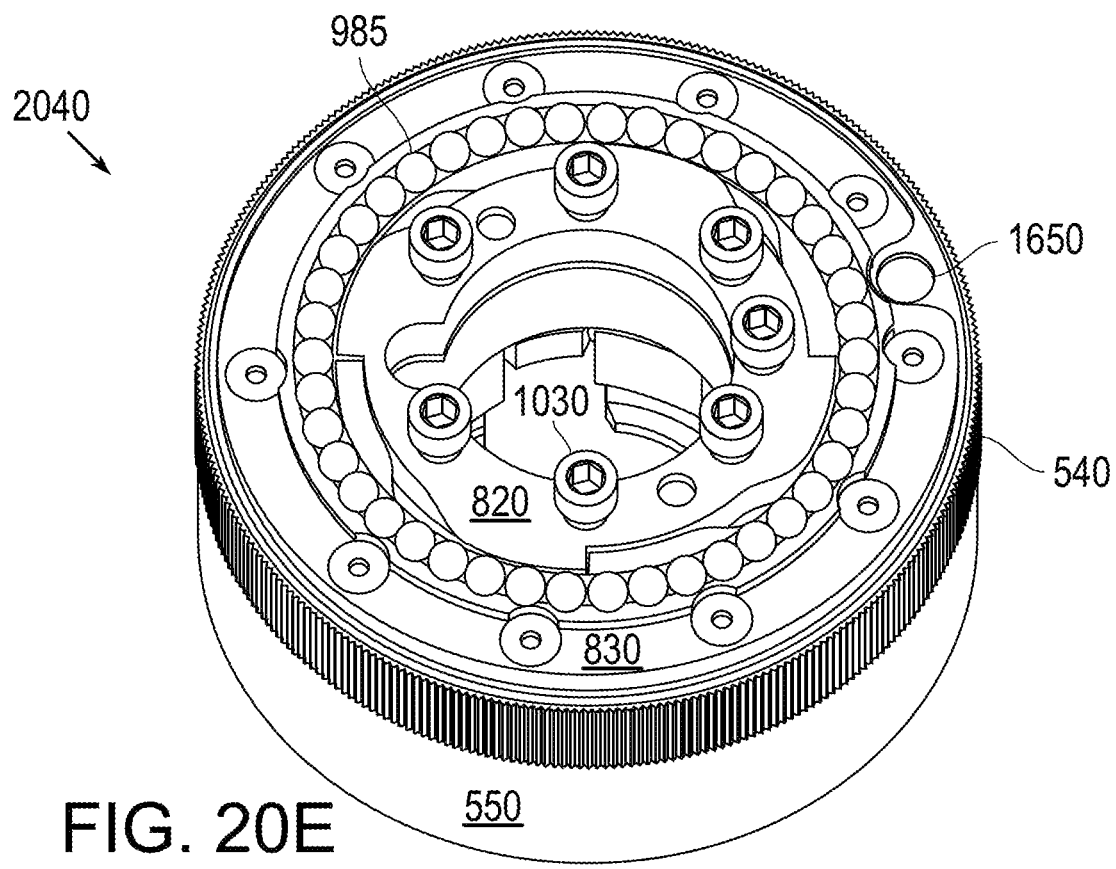
FIGS. 20E, 20F, 20G and 20H are plan and isometric assembly views of the aft section.
Figure 20F:
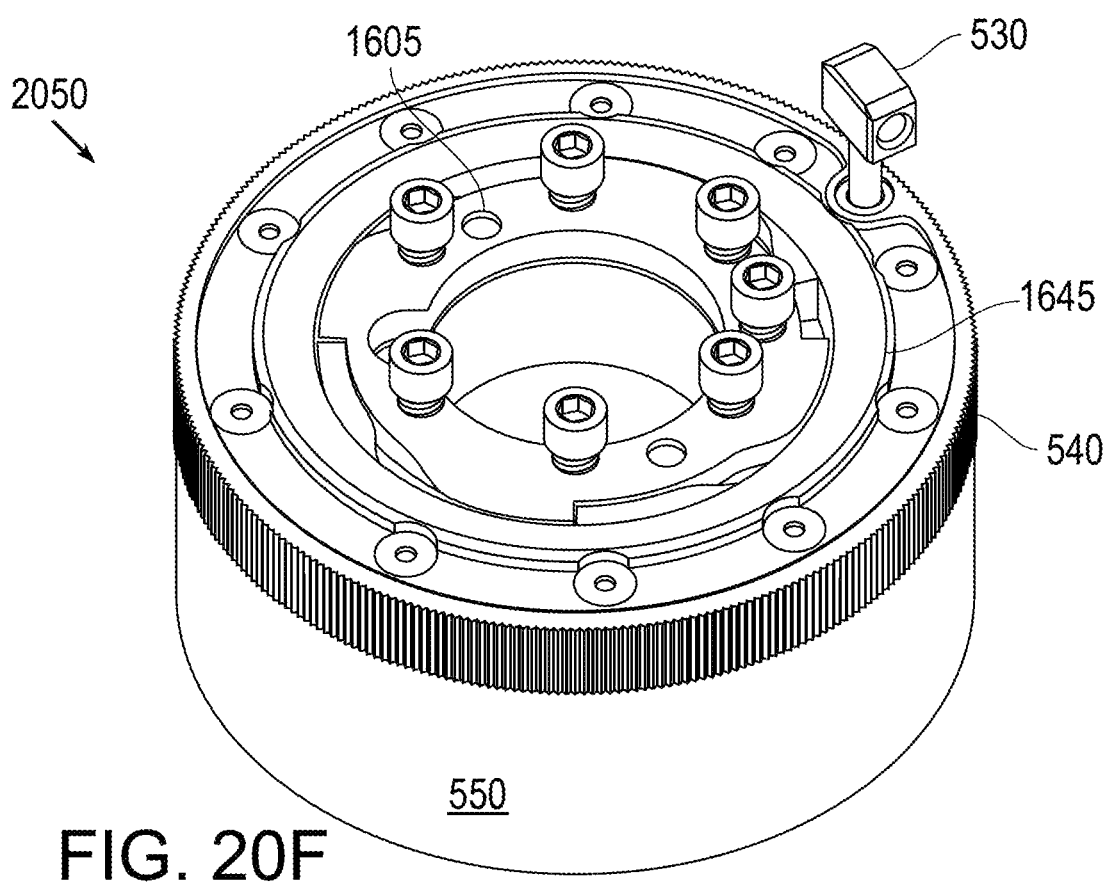

FIG. 20D shows a plan view 2030 of the aft section 240 absent the thrust bearing 910 and the insertion ring 820, with the release pin 530 removed and the lock ring 920 rotated clockwise 1070 to the unlocked position. FIG. 20E shows an isometric assembly view 2040 of the aft section 240 absent the thrust bearing 910 and the insertion ring 820, with the release pin 530 removed and the lock ring 920 rotated clockwise 1070 to the unlocked position. FIG. 20F shows an isometric assembly view 2050 of the aft section 240 as locked with the release pin 530 installed and absent the thrust bearing 910 and inner ball bearing spheres 985.

Figure 20G:
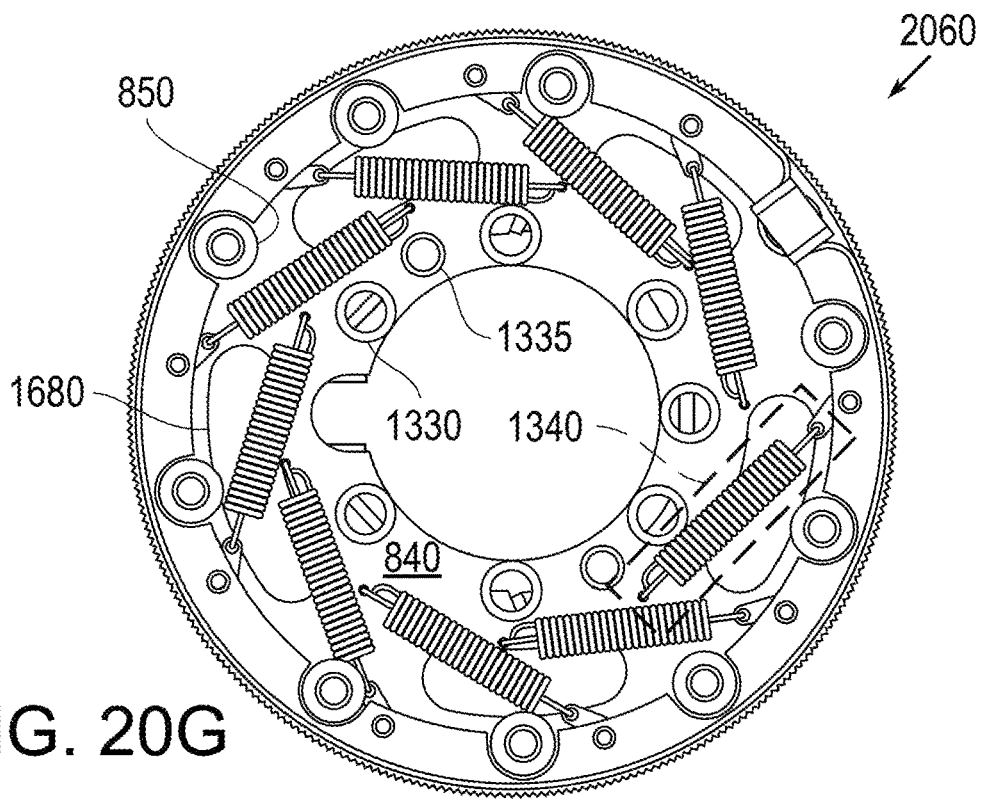
Figure 20H:
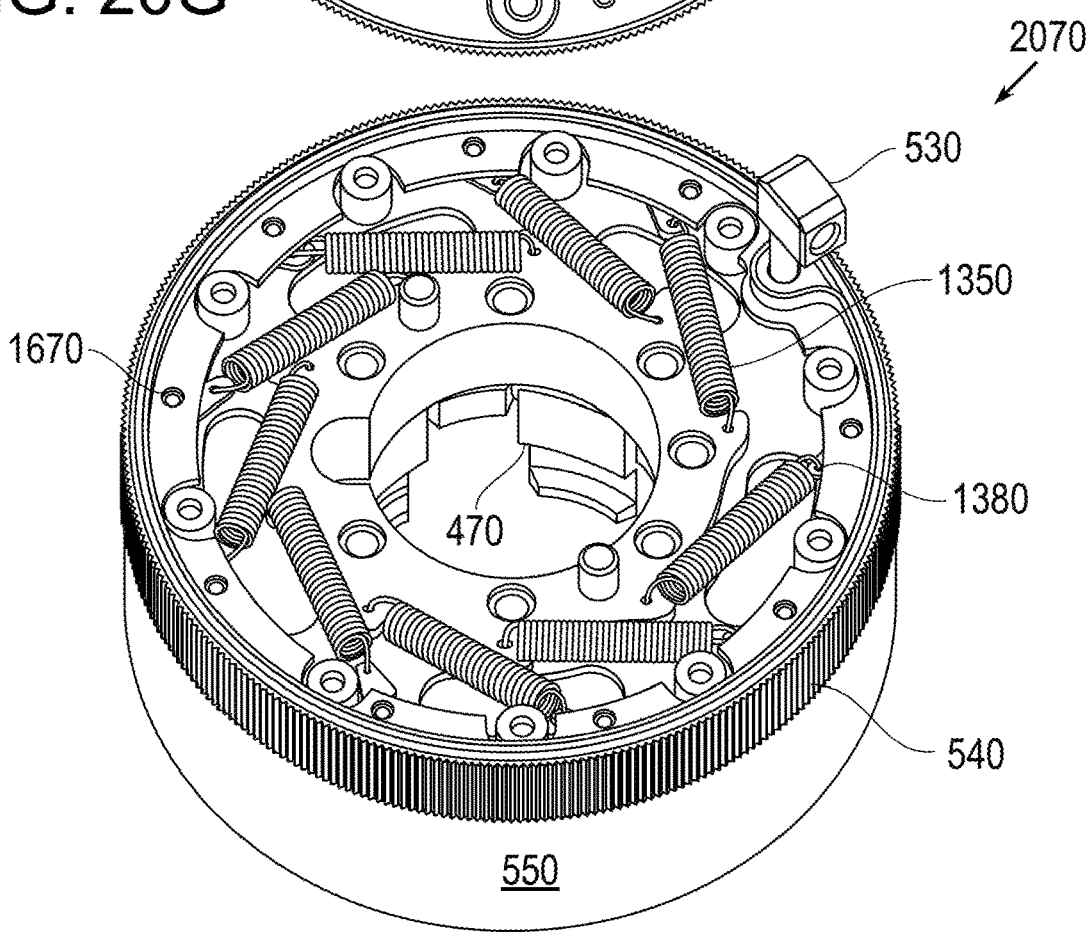

FIG. 20G shows a plan assembly view 2060 of the aft section absent the thrust bearing 910, ball bearings 985, insertion ring 820 and the fore plate 830. The lock ring assembly 920 is shown rotated anti-clockwise 1060 to the locked position with the release pin 530 installed. FIG. 20H shows an isometric assembly view 2070 of the aft section 240 absent the thrust bearing 910, inner spheres 985, insertion ring 820 and fore plate 830. The lock ring 920 is rotated anti-clockwise 1060 to the locked position with the release pin 530 installed. The axial post 1920 inserts into holes 1260 of the annular housing 550. The views 2060 and 2070 feature the same content from separate perspectives.

Figure 21A:
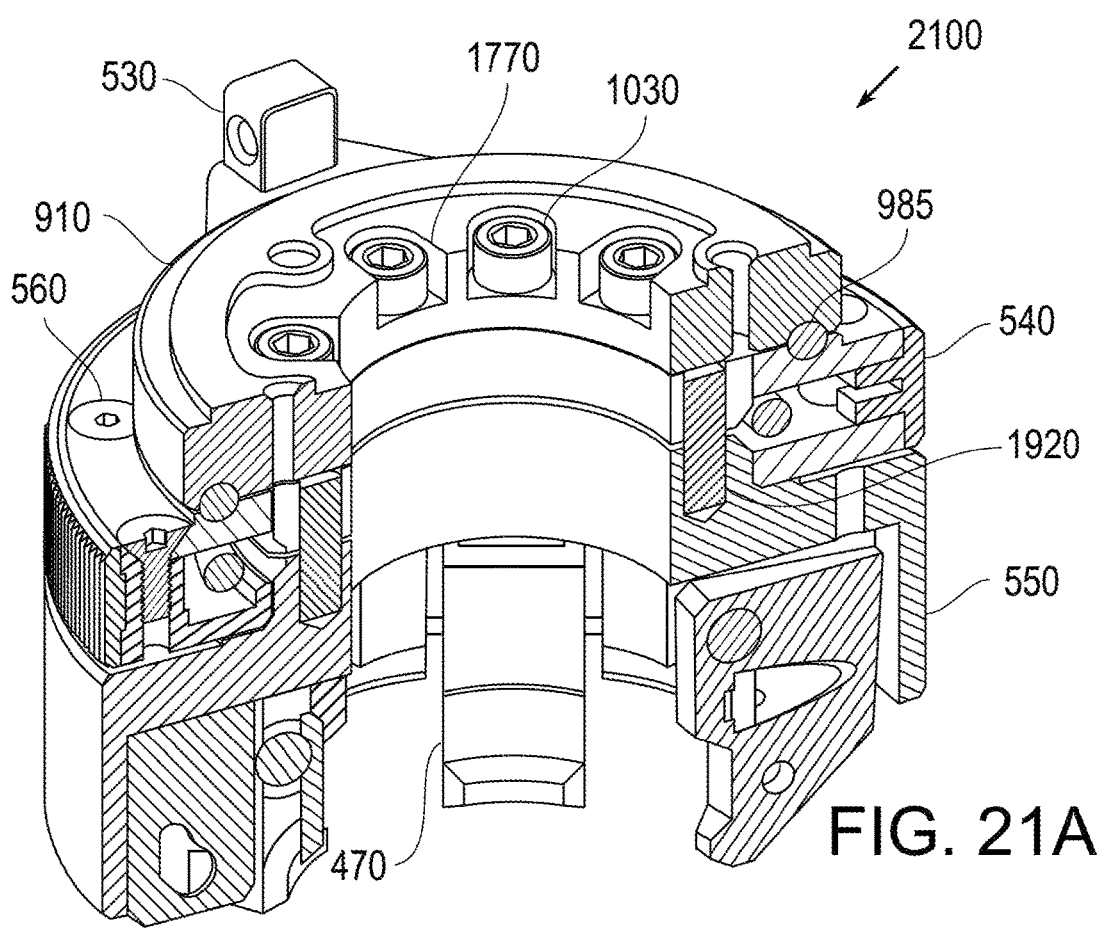
FIGS. 21A and 21B are respective isometric and elevation cross-section views of the aft section.
Figure 21B:
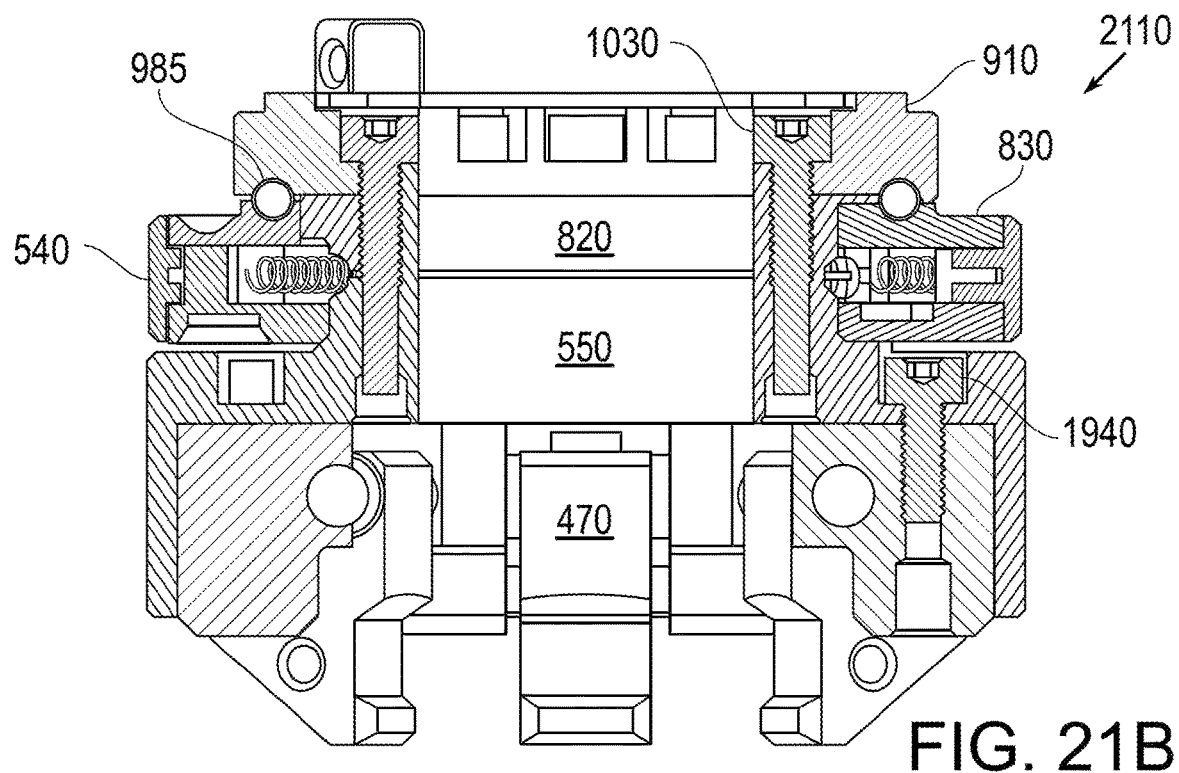

The plan view 2060 in particular highlight the tensioners 1340 attached to the tension ring 1310 and the edge ring 540. The pair of holes 1625 in the insertion ring 820 receive posts 1920 that extend through the tension ring 1310 by two of its holes 1335 for alignment with the aft plate 840. The inner spheres 985 are disposed between lower annular bearing race 1645 of the lock ring 920 (in view 2050) and upper annular bearing race 1090 of the lock ring 910 (in view 1000). FIG. 21A shows an isometric assembly cutout view 2100 of the aft section 240. FIG. 21B shows an elevation cross-section view 2110 of the aft section 240, featuring both hex bolts 1030 and 1940. Recall that hex bolts 1030 connect the thrust bearing 910, insertion ring 820 and annular housing 550, and that hex bolts 1940 connect the annular housing 550 to the wedges 960.

This description for the exemplary article 160 introduces a plethora of mechanical items across the drawings. To facilitate understanding, these are summarized as follows:

(1) loop connector 260 with the captive loop 310 and cinches 320.
(2) fore assembly 330 with fore section 220 and its sleeve 230. This includes the cap module 670 and the electronics module 680.
  (a) cap module 670 with retaining ring 510, cap lip 620 and cage housing 630 that receives the captive loop 310.
  (b) electronics module 680 that includes battery retainer 640 and circuit boards 650 and 660 to secure the pigtail wire 420.
  (c) long bolts 520 that connect cap module 670, electronics module 680 and the thrust bearing 910 together.
(3) mechanical assembly 410 with release mechanism 250 and aft section 240.
  (a) release mechanism 250 that includes the thrust bearing 910 and its release pin 530.
  (b) aft section 240 that includes mezzanine subassembly 810, compression module 940 and grip module 950.
  (c) mezzanine subassembly 810 with insertion ring 820 and lock ring 920.
  (d) lock ring 920 with insertion ring 820, fore plate 830, edge ring 540, torsion set 930 and aft plate 840; inner bearing spheres 985 arranged along an annular race 1645 on the fore plate 830 to enable the lock ring 920 to rotate.
  (e) compression module 940 with annular housing 550 equipped with outer spheres 980.
  (f) grip module 950 with claws 470 held by wedges 960 that attach to the annular housing 550 to clamp onto the round 150 at bosses 460.
(4) lock ring 920 in mechanical assembly 410 rotates.
  (g) rotation of lock ring 920 anti-clockwise 1060 with release pin 530 secures claws 470 to bosses 460.
  (h) removal of release pin 530 rotates lock ring 920 clockwise 1070 by torsion set 930 to withdraw claws 470 from bosses 460.

Due to the confusing number of alignment and fastener components, a summary is provided regarding connection of particular components. The captive loop 310 inserts into holes 710 of the cage housing 630. Long bolts 520 insert into holes 720 of the cage housing 630, holes 1150 of the fore circuit board 650, cavities 1160 of the retainer 640 and holes 1050 of the thrust bearing 910. The release pin 530 inserts successively into the hole 1020 on the thrust bearing 910, the hole 1650 on the edge ring 540, and the hole 1290 on the annular housing 550. The screws 560 pass through holes 835 in the fore plate 840 and thread successively into studs 850 successively. The studs 850 in the aft plate 840 align with horseshoe notches 1560 of the edge ring 540, best observed in view 2070.

The hex bolts 1030 insert into corresponding holes 825 on the insertion ring 820, holes 1770 on the thrust bearing 910, cutouts 1660 in the edge ring 540, holes 1330 through the tension ring 1310 of the torsion set 930 and holes 1250 on the annular housing 550. The anchors 1390 on the heads 1360 of the tensioners 1340 insert into corresponding holes 1670 of the edge ring 540 that contains the torsion set 930. The alignment pegs 965 insert into fore holes 1275 on the reverse side of the annular housing 550 and aft holes 1540 on the wedges 960. The outer spheres 980 occupy cavities 1280 in the annular housing 550, and partly insert into pockets 1690 on the aft plate 840. The posts 1920 insert into holes 1625 on the insertion ring 820, holes 1335 in the tension ring 1310 and holes 1260 on the annular housing 550. The hex nuts 1940 insert into holes 1530 on the wedges 960 and holes 1270 on the annular housing 550.

The exemplary hood article 160 was conceived as a stable management and communications vehicle capable of remote communication with an experimental or prototype round 150 while being rammed into the 5-inch diameter bore from the breech 122 into the chamber 124. The main objective of the exemplary article 160 was to maintain mechanical connection to the round 150 through the ramming process while preventing the combination umbilical 130 from catching in between the round 150 and the gun breech 122. This maintaining open communications and external power on via batteries 480 and 780 in the retainer 640 and a remote computer 190 in the fire control room wired to the article 160, while sitting idle in the chamber 124 prior to the round 150 being fired. The article 160 was also designed as a vehicle to carry the printed circuit boards 650 and 660 and batteries 480 needed for communicating with the round 150 as crucial test events change throughout the test sequence, and to protect the electronics from getting damaged during operations or from the gun blast overpressure.

The exemplary hood article 160 has five main design requirements:
(1) mechanically latch to the round 150—and stay locked during operation being rammed in from the breech 122 to the chamber in the chamber 124, without the added weight size or shape causing undue stress on the round 150—then with minimal effort the article 160 can be remotely pulled and disconnected on command before the round 150 is fired.
(2) manage communication cables—prevent disconnection from the round 150 during ramming process—and to avoid getting caught in between round 150 and chamber 124 during ramming—this could pinch, cut or expel something including experimental rounds or computers if wires severed during ramming process.
(3) capable of being remotely pulled with little or no effort out of chamber 124 and firing the round 150 as the test article within 1 minute to 6 minutes of the article 160 being out of gun 120—this can be accomplished in one minute.
(4) re-attach and reset quickly—enabling rapid exchange to another round 150.
(5) protect electronics and battery—electronics module 680 contains printed circuit boards 650 and 660 and batteries 480 for communication with the round 150 via mission critical programming logic.

Prior to the round 150 or the propellant charge being brought out to the gun 120, a catch arm assembly 128 attaches near the muzzle 126 of the chamber 124, and the electric winch 180 attaches to an anchor behind the gun 120. The wire cable 134 and communication link 136 connect together with adhesive duct tape every foot of length, the combination strapped together equals to the total length through the chamber 124 and catch arm 128, plus a few feet.

The pull string 132 for the release pin 530 via the kink 570 connects to the umbilical 130 in a couple places via some pieces of masking tape 590 about 2 feet to 5 feet back toward the muzzle 126 (not duct tape). Then the communication link 136, the wire cable 134 and the pull string 132 for the release pin 530 are fished through the chamber 124 as an umbilical 130 from the muzzle 126 to the breech 122. These lines are attached to the article 160 on the loading tray 140.

The next step connects the article 160 to the round 150. This can be accomplished by one of two optional methods:
(a) the article 160 can be attached to the round 150 prior to being brought out to the gun line, so round 150 and article 160 can be brought as an assembly.
(b) the article 160 can be out at the gun line and the round 150 brought separately, then the article 160 attaches on the loading tray 140 of the gun 120. The standard operating procedure (SOP) selected option (a).

With multiple articles 160, this would render multiple shots easier and range time more efficient. To attach, an operator loosens and removes the outer sleeve 230 containing the retaining ring 510 and remove the outer sleeve 230. If option (b) is chosen, the retaining ring 510 and outer sleeve 230 can slide back over the umbilical combination 130 and out of the way. The operator can install new batteries 480 in the battery retainer 640 and electronically connect the article 160 to the round 150 via the pigtail wire 420 and its aft nano-d connector 440 extending rearward.

The operator then slides the jaw teeth 1440 over its attaching bosses 460 of the sabot 360 while simultaneously slipping the pigtail wire 420 back inside the retainer 640. Once the article 160 physically attaches to the round 150, it can be locked with the release pin 530 inserted into successive holes 1020, 1650 and 1290. The operator can insert and tighten the two zip-ties 490 into loop holes 1130 turning the zip-tie 490 around behind the pigtail wire 420, cinching the pigtail wire 420 to the retainer 640 and panel 740, eliminating any undue stresses at the nano-d connector 430 from the pigtail wire 420 on the fore circuit board 650 during removal operations. Then reinstall the outer sleeve 230, reinstall the retaining ring 510 and tighten. At this stage, the round 150 and article 160 can be brought out to the gun line and disposed on the loading tray 140. With the umbilical combination 130 entering the muzzle 126, passing through the chamber 124 and out from the breech 122 to the loading tray 140, the communication link 136, wire cable 134 and pull string 132 are taped together as umbilical combination 130 to attach to the article 160.

At this point, communications with the round 150 can be confirmed. Assuming everything is acceptable, all engineering personnel can be evacuated from the gun line and explosive certified personnel can take over. At the muzzle 126, a bungee rope 138 attaches to the wire cable 134 entering the gun 120 immediately outside the catch arm 128. The opposite end of the bungee rope 138 attaches to the manual winch 185 behind the gun mount separate from the electric winch 180. The bungee rope 138 is wound taut until the ILP round 150 starts to move forward, creating enough positive pulling action by the bungee rope 138, preventing all lines in the combination umbilical 130 from binding, pinching or catching in between the chamber 124 and the round 150, while the round 150 is being rammed into the gun 120. The gun crew then manually rams the round 150 with the bungee rope 128 connected and stretched. Once the round 150 is confirmed properly rammed and seated in the chamber 124, and communication with the round 150 remains live, the bungee rope 128 can be released and removed, removing all tension on the article 160. At this stage, the experimental round 150 is rammed but no propellant charge has been installed in the gun 120. The pull string 132 can be pulled and removed from the muzzle 126, removing the release pin 530 and unlocking the lock ring 920 and thereby the grip module 950. By design, the article 160 remains physically attached and electronically connected to the round 150.

With a final confirmation of communications with the round 150 and the wire cable 134 and the communication link 136 still connected, the gun line can now be declared hot. The propellant charge can be brought out to the gun 120 and placed in the breech 122 and with the gun line cleared for live fire. The test round 150 seats in the chamber 124, the gun 120 has a live propellant charge in the chamber 124, and the gun 120 is set to proper elevation and ready to fire.

The anti-dropdown stop 945 in the compression module 940 inhabits the article 160 from moving aft towards the round 150 during a particular circumstance that can occur when the gun 120 is elevated after the round 150 is rammed, the propellant charge loaded, and the breach 122 closed. A gap of a few inches remains between the top of the propellant charge and the rear of the round 150, and this is normal. In some situations when the gun 120 is elevated to a high shot angle, the ILP round 150 will drop or slip backward toward the propellant charge and halt abruptly when striking the propellant charge. In this situation, the article 160 is unlocked but attached through tensile force of spring sets 1290. Concerns were raised that under these conditions, the article 160 could disconnect when the round 150 abruptly halts on the propellant charge or electrically disconnects. This was addressed by incorporating the anti-dropdown stop 945 within the article 160 itself to prevent such capability of rearward motion.

Everything is accomplished remotely from this instance, and the round 150 is activated and readied for fire via the computer 190 in the control room. When the range officer gives the clear to fire, the article 160 can be remotely pulled via the wire cable 134 and the winch 180 through the chamber 124. After the article 160 is observed on video in the control room egressing from the muzzle 126 and flips down with the catch arm 128, the round 150 can be remotely fired. Note that this configuration can be used for rail gun as well as round bore.

The engage set 1490 inside each claw 470 forces the jaw tooth 1440 to the closed position—can move 1.5° to about 3° past closed position. The spring tension from each engage set 1490 is about 8 lb$_f$ thereby providing the article 160 a firm grasp onto the boss 460. Only about 5 lb$_f$ of pull force is required to remove the article 160 after the release pin 530 is removed. This feature enables the round 150 and the article 160 to remain in the gun 120 unlocked with all wires attached, ready to be remotely pulled, and ready to be fired, without concerns of the article 160 dropping off and losing communication with the round 150.

The electronics for the article 160 can be changed, replaced or swapped out for any reason with little effort. Four cap long bolts 520 are laced through the fore section 220. These 10-32 long bolts 520 enable access to electronics parts, such as on the circuit boards 650 and 660, as well as facilitating replacement of the batteries 480 and/or 780. The outer sleeve 230 and retaining ring 510 enables access by unscrewing the retaining ring 510, slipping outer sleeve 230 off battery retainer 640 while the combination umbilical 130 is hooked up to the article 160 or before these are attached. The O-rings 760 serve to hold the batteries 480 and 780 in position during operations and with the outer sleeve 230 removed.

Attachment of the article 160 to test round can be accomplished in five steps:
 (a) remove or confirm removal of the release pin 530 to enable the lock ring 920 to rotate clockwise 1070 to the unlocked position.
 (b) remove retaining ring 510 and outer sleeve 230, install new batteries 480 and 780, ensuring battery retaining O-rings 760 are seated in the radial grooves 1110 of the retainer housing 640.
 (c) attach the nano-connector 440 on the pigtail wire 420 to the sabot nano-d receptacle 450, slip the claws 470 over the protrusion boss 460 of the sabot 360.
 (d) without rotating the article 160 about the round 150 or sabot assembly 360, rotate the lock ring 920 anti-clockwise 1060 to the locked position, and install the release pin 530.
 (e) secure the pigtail wire 420 with zip-ties 490 at the captive loop holes 1130, trim the tails of the zip-ties 490, reinstall the outer sleeve 230 over the cap 630 and thread the retaining ring 510 on the top cap 630.

Note that zip-ties 490 when installed in captive holes 1130—restrain the pigtail wire 420—when the article 160 is remotely pulled, it pops off the round's receptacle 450, as the article 160 moves out towards the muzzle 126. The pigtail wire 420 remains connected until running out of slack. In addition to the cost of these two nano-d connectors 430 and 440, at the connection of article 160 and the round 150, the pigtail wire 420 assembly is an integral part of communicating and feeding power to the round 150 through the article 160. There were concerns that as the article 160 was removed, the pigtail wire 420 if not restrained could be damaged at either end. In particular, the nano-d connector 440 could be damaged if permitted to exit and dangle freely outside of the article 160 housing as the article 160 is dragged out from the muzzle 126 and swings around in the catch arm 128 during removal.

Serious concerns also arose to restrain the pigtail wire 420 during this removal operation. Otherwise, this would induce undue stresses on the opposite end at the nano-d connector 430 of the circuit board 650. If damage accrued at either end of the pigtail wire 420, this could render the article 160 unusable for the next test round. Two sets of captive loop holes 1130 are machined into the battery retainer 640. This enables zip-ties 490 to be installed into one side of the captive loop holes 1130 and the zip-tie 490 is turned around in the captive loop 310; it is turned around behind the pigtail wire 420 and back out the opposite side of the captive loop hole 1130. One zip-tie 490 can sufficiently secure the pigtail wire 420 against the battery retainer 640, two zip-ties 490 are installed for redundancy. The excess tails of the zip-ties 490 are cut and removed. The outer sleeve 230 can be installed over the cap lip 620, cage housing 630 and battery retainer 640, then the retaining ring 510 is threaded thereon.

Extension springs 1350 have working limitations within their designs for critical reliability. The lock ring 920 is halted by the over-rotating stops 1610 and 1630 before the springs 1350 exceed their stretch limits. In particular, the lock ring 920 is designed with rotating limit edge stops 1620 and 1640 to ensure the springs 1350 remain within their operable limitations. When the release pin 530 is removed, the lock ring 920 automatically rotates clockwise 1070 to unlock—because nine extension springs 1350 on the torsion set 930 connect to lock ring 920 in circular fashion—creating 50 lb$_f$ of torque in the absence of any rotational limit stops between the insertion ring 820 and the fore plate 830. Without these stops, the lock ring 920 would keep rotating clockwise 1070 and destroy the extension springs 1350. The lock ring 920 is also designed with over-rotating stops 1610 and 1630 to eliminate possibility of over-rotating the lock ring 920 or over-stretching the extension springs 1350 when twisting the lock ring 920 anti-clockwise 1060 into the locked position.

Design weight for the exemplary article 160 should be less than 6 lb$_m$ for the five-inch gun 120 to avoid jamming with a low center of gravity—not jam and can unlock irrespective of load applied to the article 160. Thus different sphere sizes are employed for the bearings. For each of the five wedges 960, the load on ridge 1430 creates compressive force on the sphere 980 as the claw 470 tries to pivot on its hinges 1410, floating in the hole 1280 that are 0.020 inch larger than the spheres 980. The lock ring 920 is forced forward by the spheres 980 into the edge ring 540 via the aft plate 840. The spheres 985 maintain the force between the mid-body thrust bearing 910 and the fore plate 830. The midbody thrust bearing 910 and top of the lock ring 920 have circular groove machined creating a bearing race 1645 similar to a lazy-Susan spinner. This creates a friction-free cavity for the lock ring 920 to rotate within.

After the release pin 530 is pulled and the lock ring 920 rotates, only the friction of the lock ring 920 needs to be overcome to rotate to the unlocked position—from the tip of the outer spheres 980 on the bottom of the lock ring 920. More specifically, contact area of a sphere 980 is restricted to a singular point 1760, and positioned in loose fitting hole 1280, so the spheres 980 can move or rotate. This provides an opportunity to rotate, which provides the lock ring 920 a starting point of momentum and enables the lock ring 920 to rotate completely if jammed.

The lock ring 920 is spring loaded by the torsion set 930 when rotated anti-clockwise 1060, so when the release pin 530 is removed, the lock ring 920 automatically rotates clockwise 1070 to the unlocked position. The nine extension tensioners 1340 of the torsion set 930 contained inside the lock ring 920 connect in circumferential fashion to the edge ring 540 creating 50 $lb_f$ torque at outer serrated surface of the edge ring 540. This is forward of the contact points of the spheres 980. The applied torque from the tensioners 1340 precludes the release pin 530 from being inadvertently pulled out and egressing the gun 120 during manual ramming from g-force inertia when the round 150 abruptly stops. Pivot limiting pockets as cavities 1520 in the wedges 960 are employed to reduce test setup time. The claws 470 can be reattached onto another test round 150 rapidly. The claws 470 provide the primary attach points of the article 160 to the round 150 by their teeth 1440 engaging the boss 460.

The overarching function of the exemplary article 160 is to replace the conventional fuze setter in a testing environment. This is designed to connect to any experimental test round 150, while feeding communications and power remotely to the test round 150 through this communication link 136, and remain connected to the round 150 while being manually rammed into the chamber 124 of the gun 120. This test set-up could be any gun for a "new" munition for, including the 5-inch gun, 3-inch gun, or railgun that is otherwise not backward compatible with existing systems. In some cases, a particular variation of round 150 that would need a "live feed" type of communication and this scenario was the case when the article 160 was developed.

Engineering decided quickly that some type of counter-mass, bungee rope 138, or springs was going to be needed to control the slack of the combination umbilical 130. Subsequently, the gun crew would accept the concept of the exemplary article 160 and draft an SOP. The biggest challenge was maintaining connections during the manual ramming process. The test round 150 was projected to be moving at 17 ft/s to 21 ft/s during the manual ramming operation. The dynamic load that the article 160 would experience when the test round 150 abruptly stops in the chamber 124, merely from the design requirement weight (6 $lb_m$) of the hood article 160 itself was disconcerting. In addition to that, the counter-mass added huge additional concerns to the operational success of the article 160.

Equally concerning, if the umbilical 130 does not move forward at the same rate and speed of the test round 150 does, that cabling could become pinched between the sabot 360 and chamber 124, possibly cutting the communication link 136. If so, the round 150 could become stuck in the chamber 124, and clearing the gun 120 of this round 150 would be unsafe and costly, in particular because with an inaugurated warhead, a shorting the wrong wires could initiate inadvertent detonation of the test round 150 (and cause all sorts of unpleasantries). All of these cable management concerns, the counter-mass, and risks during manual ramming became a difficult challenge in developing a mechanism that would remain connected to the test round 150 but could also be readily removable on command.

All that in mind; too heavy of counter-mass is not necessarily better. Consider one's kitchen sink spray nozzle, it has a little counter-mass attached to the hose underneath the sink. That counter-mass retracts the hose back underneath the sink when one has finished using it. If one replaces that small counter-mass weight with a 5 $lb_m$ counter-mass, then raises the spray nozzle and for release, the spray nozzle eventually pops off, spraying water in all directions. When abruptly stopping in its cradle, that dynamic load on the spray nozzle is very similar to what the article 160 experiences when the round 150 is manually rammed from the breech 122 to the chamber 124 and abruptly stops. A counter-mass attached to the cabling amplifies this dynamic load on the article 160.

The requirement of the exemplary article 160 was to connect to the test round 150 and remain connected while this counter-mass is pulling on the combination umbilical 130 as well as when the round 150 halts abruptly in the chamber 124, but on the other hand be easy to remove on command before the round 150 is fired. This was a very challenging requirement to accomplish. There was a lot of decision about what might happen during this part of the operation such as; cables disconnecting, cables getting pinched, the article 160 getting stuck caddywompus (like a sticky dresser drawer) after ramming coupled with inability for its removal, and the article 160 detaching as the test round 150 abruptly halts during ramming.

One of the biggest concerns was the program managers did not want a situation where the article 160 was stuck and could not be removed, forcing the gun crew to use an elaborate round removal process. The article 160 and the umbilical 130 would all cause difficulties with that specific operation and the SOP, if the article 160 was stuck and the round removal process was performed. These concerns created multiple new negative scenarios that were introduced at every meeting, they just never stopped coming. If something was designed that was extremely difficult to pull off, then equally it was extremely difficult to remotely remove on command. Initially after considering several ideas, and evaluating a few concepts through a preliminary design review, no design seemed satisfactory. This led to the conclusion the solution to this problem was developing something that locks during this manual ramming process, then unlocks after ramming but remains attached, and then is easy to remove remotely because it is unlocked, but nonetheless firmly attached.

The first part of the exemplary mechanism or article 160 is the lock ring 920, which comprises the components between ball bearings as spheres 980 and 985. The lock ring 920 moves angularly as a unit. Its motion is restricted by the anti-over-rotating insertion ring 820 and the fore plate 830 of the lock ring 920, which only rotates about 17° by angle 2005. The lock ring 920 connects to the torsion set 930, via its anchors 1390 at the edge ring 540. The tension ring 1310 is stationary and connects to the annular housing 550 by the two pins 1920 and the hex bolts 1030.

When the exemplary article 160 is in an unlocked state, the spring assemblies 1340 are in a relaxed state between their anchor pins 1390 and the tension ring 1310. To lock the article 160, the lock ring 920 is twisted in the anticlockwise 1060 direction. Then the release pin 530 is installed to restrict the motion of the lock ring 920. When the lock ring 920 is rotated anti-clockwise 1060 to this locked position, the through hole 1650 in the edge ring 540 aligns with the through hole 1020 in the thrust bearing 910 and the hole 1290 in the annular housing 550. The release pin 530 can now be installed through holes 1020, 1650 and 1290 to secure the lock ring 920.

Installing the release pin 530 locks the article 160. This stretches the spring assemblies 1340 at their anchor pins 1390. With the article 160 locked, the springs generate about 50 $lb_f$ of radial torque on the lock ring 920. Upon removal of the release pin 530, the torsion set 930 snaps the lock ring 920 clockwise 1070 to the unlocked position via the 50 $lb_f$ of torque these springs 1350 create. The need for the anti-over-rotating insertion ring 820 is because all the springs 1350 have a working load and a set distance of compression or stretch. In other words, if the design enables the lock ring 920 to rotate just a couple more degrees anti-clockwise 1060, the springs 1350 would be over-stretched and lose their resistance or be compromised. In the clockwise 1070 direction over-rotation compresses the springs 1350 to the point of deformation and possibly damages other components of the spring set 1340 or the torsion ring 1310.

An additional function of the lock ring 920 is to lock and unlock the article 160. The locked position confines the movement of claws 470 latching the article 160 onto the test round 150, while in the unlocked position the claws 470 are free to move, this enables the article 160 to be easily removed from the test round 150. When the article 160 is in the locked position, the aft plate 840 of lock ring 920 blocks the movement of the claws 470. Upon removal of the release pin 530, the torsion set 930 rotates the lock ring 920 clockwise 1070 to the unlocked position. This aligns a pocket-cut 1490 in the aft plate 840 of the lock ring 920 to just above the cavity 1280 in the annular housing 550 that receives the bearing spheres 980, enabling the latter to move forward. This pocket-cut 1490 enables the claws 470 to pivot on hinges 1410 by providing room for the bearing sphere 980, thereby unlatching the article 160 from the round 150.

The second part of the article 160 is the engage set 1490 located inside each of the claws 470. The engage set 1490 forces the claw 470 in a closed position irrespective of the position of the lock ring 920. The claws 470 have a radial boss extruded from the bottom of each claw 470 has a tooth 1440 engaging the boss 460 on the sabot 360. This enables latching the article 160 onto a test round 150 with little effort in the field—it snaps in position similar to an aspirin bottle cap.

Most importantly, the spring pressure from the engage set 1490 and the claws 470 hold the article 160 securely attached to the test round 150 while unlocked and waiting to be remotely removed. When in this position, unlocked but still attached to a test round 150, only 5 lb$_f$ of pull force is needed to overcome the engage set 1490 and remove the mechanism. All five of the claws 470 have a knob 1420 on either side, when assembled these protrude into corresponding kidney-shape cavities 1520 of the adjacent wedges 960. This restricts the pitching motion of the claws 470, enabling them freedom to move a few degrees in both directions more than needed to function but stops them from over-rotating in either direction. This also restrains the working load of the springs 1470 and their distance of travel. The hood article 160 can unlock without failing even in the event of a jam, e.g., a load or force on the mechanism while trying to unlock, because friction has been designed to be minimized out of the moving components so as to rotate to the unlocked position via the torque generated by the torsion set 930.

The article 160 has been tested by attaching it to a dummy test round 150 that weighed about 50 lb$_f$. The dummy round 150 was then lifted up with the mechanism 160 and held it a few inches off the ground. With 50 lb$_f$ of deadweight held by the grappling claws 470, the release pin 530 was withdrawn and the mechanism 160 dropped the dummy round 150 every time flawlessly. Additional mass was applied to the dummy round 150 taking this exercise up to about 100 lb$_m$, when the release pin 530 was pulled the mechanism still unlocked and released the dummy test round 150 every time. This constituted success.

All of those things; the lazy Susan concept of inner spheres 985 as bearings in the race 1645, the lose fitting hole 1280 in the annular housing 550, the hardness and surface finish of ball bearings as outer spheres 980, the small contact points 1760, and the 50 lb$_f$ of torque created by the torsion set 930, all create a circumstance where the mechanism 160 unlocks when the release pin 530 is removed while under load or a jammed condition.

The SOP for removing rounds from the chamber of a gun 120 if a round 150 is stuck and needed to be cleared necessitates careful attention. The first thing is the gun crew opens the breech 122 of the gun 120 and removes the powder charge. They then use a large wooden pole with a cup-shaped attachment on the distal end of the pole to push the round 150 out backward. This is accomplished by inserting the pole in the chamber 124 from the muzzle 126, distal end first, sliding the pole down the chamber 124 until the distal end slips over the fuze and rests on the body of the round 150, and then someone from the gun crew smacks the proximal end of the pole with a sledgehammer.

Design Requirements can be listed as follows:
1. All of the components of the article 160 that will contact with the bore of the barrel of the gun 120 or riffling during operations must be composed of steel.
2. Weight needs to be below 6 lb$_m$, with the material requirement being steel, this rendered the weight requirement more challenging.
3. The article 160 was required to be small enough to be used on the railgun but also work with the 5-inch gun.
4. The article 160 must remain connected during the manual ramming process of 17 ft/s to 21 ft/s.
5. The article 160 must also remain connected when the round 150 (or ILP) abruptly stops in the chamber 124.
6. In addition to connections, the article 160 must stay attached while under tension from the counter-mass weight during manual ramming, irrespective of cable slack this tension or counter-mass.
7. The article 160 must be sufficiently robust to withstand the gun blast overpressures, tolerating kinetic impact (i.e., getting smacked around or dropped from the muzzle 126 of the gun 120 to the ground), but remain reusable.
8. The article 160 must remain attached after ramming and gun range safety clears the range.
9. The article 160 shall be easy to remove on command.
10. Cable management and controlling the umbilical 130 needs to be part of the overarching design.
11. The article 160 was required to be remotely removed and out of the chamber 124 as quickly as possible.
12. The article 160 had some electronic interface requirements such as; battery compartments, printed circuit boards, Amphenol connectors, safety shunt plug, key fill 340, and electrical power. The article 160 needs to interface mechanically with these electronics and avoid interference.
13. The article 160 was required to protect all of the printed circuit boards 650 and 660 and batteries 480 form the environment of this test and gun blast.
14. The article 160 was required to be self-contained, with no lose parts or electronics that could come off and stay behind. This was a huge safety concern if a screw fell off or a battery 480 fell out of the article 160 and lodged between the round 150 and the chamber 124 when the round 150 is fired.
15. In addition to the above self-contained requirement, the battery retainer 640 needs to be accessible with ease to replace batteries 480 on test day.
16. The article 160 is required to be resettable and reusable in the field on test day from one test round to another quickly and easily, preferably without tools.

17. The article 160 is required to have robustly connect to a powered winch 180.
18. The pigtail wire 420 must remain attached (i.e., spring loaded) during manual ramming.
19. The pigtail wire 420 must be protected from stress at the nano-d connector 430 on the fore printed circuit board 650 during remote removal.

Range safety does not want anything in front of the gun 120 during testing, items outside of the blast zone can still be picked up and tossed by the overpressures when the gun 120 is fired. Range safety decided to have the winch 180 and/or the counter-mass behind the muzzle 126 of the gun 120, then attach a catch arm 128 to the barrel. The catch arm 128 only extends about one foot past the muzzle 126 and drops to the lower position when the article 160 is removed. They also used the catch arm 128 as a pulley system to redirect or turn the cabling 180° behind the gun 120 toward the winch 180.

Using duct tape, the gun crew attaches together a wire cable 134 and the gray communication link 136, leaving extra length or slack in the communication link 136 at the side of the article 160. With the wire cable 134 and the communication link 136 taped together firmly with duct tape, the gun crew uses masking tape 590 to lightly connect the pull string 132 for the release pin 530 to the wire cable 134 and communication link 136. Everything as an umbilical 130 except the bungee rope 138 is fished through the catch arm 128 and pulled back to the loading tray 140 through the chamber 124, and through the breech 122. The pull string 132 for the release pin 530 does not need to go through the catch arm 128—this can be fished out after wire cable 134 and communication link 136 are connected to the article 160.

The article 160 gets loaded with batteries 480 and 780. The pigtail wire 420 attaches to the round 150. The hood mechanism 160 is then pushed onto the round 150, the claws 470 snap into position on the boss 460 of the sabot 360. The engage set 1290 holds each claw 470 attached until the lock ring 920 is rotated anti-clockwise 1060 and the article 160 locks in position. The battery retainer 640 has machined loops machined therein to capture the pigtail wire 420 with zip-ties 490 and to protect the printed circuit boards 650 and 660 from any undue stresses at the nano-d connector 430 during removal of the article 160. Should damage accrue during removal at either connection 430 or 440 of the pigtail wire 420, this could surrender the test event as incomplete, rendering reschedule at a later date necessary—thus accruing costly range expenses and a program scheduling slip—the cause of which would be a failure of the article 160, which has been designed to avoid this circumstance.

The zip-tie 490 is inserted into a captive U-turn hole 1130, it enters on one side of the pigtail wire 420, then strikes a loop shaped cavity 1130, this turns the zip-tie 490 around behind the pigtail wire 420, the zip-tie 490 then exits on the opposite side, the zip-tie 490 is then cinched tight and the pigtail wire 420 is restrained. The outer sleeve 230 is installed and the retaining ring 510 is threaded on. These two items facilitate changing batteries 480 in the field, the design also contains all necessary components inside the article 160. This eliminates the possibility of something from the circuit boards 650 and 660 or batteries 480 falling out into the chamber 124 to introduce safety problems for when the round 150 is fired.

The lock ring 920 is rotated anti-clockwise 1060 to the locked position, and the release pin 530 is installed into the thrust bearing 910. The test round 150 is then laid down in the loading tray 140, with a shunt plug attached. The wire cable 134 connects to the article 160 using a carabineer 580 above the cap lid 620. The combination umbilical 130 is connected with slack so nothing pulls on the communication link 136 when the article 160 is pulled out via the winch 180. The pull string 132 is tied to the release pin 530. The gun range is cleared of all non-essential personal and the range is cleared to go hot. The shunt plug (not shown) is removed by the gun crew.

The bungee rope 138 is attached to the wire cable 134, before the catch arm 128. The bungee rope 138 is wound up on a manual boat winch 185 until the test round 150 tries to move forward from the bungee cord's tension. Two operators from the gun crew hold the ILP or test round 150 back from this tension, while three other operators use a large wooden pole to manually ram the test round 150 from the breech 122 to the chamber 124. Operators holding the round 150 release it, and the remaining personnel on the ramming pole ram the test round 150. All the spring-tension from the bungee rope 138 on the cabling and everything being taped together moves the umbilical 130 with the test round 150 without any issues. The exemplary article 160 stays connected because it's locked together to the round 150. The pigtail wire 420 stays connected to the round 150 because it is secured with zip-ties 490 and the compression from the spring 1120 on the backside of the nano-d connector 440.

To unlock the article 160, the pull string 132 is grabbed and pulled out of the chamber 124 in a very quick snatching motion. The string 132 is only lightly attached with masking tape 590 to the other lines forming the umbilical 130, and there is slack between the taped portion of the string 132 and the release pin 530. The tape 590 must be broken and the pull string 132 has to move a couple inches before removal of the release pin 530. This maintains all of the tension that could transfer to the article 160 during this unlocking step to the article 160 that remains locked. The release pin 530 is pulled completely out of the chamber 124, satisfying range safety due to visual confirmation. The exemplary article 160 is now unlocked and the engage set 1290 holds the article 160 connected to the round 150 in the chamber 124.

Through the remote computer 190 in fire control room, engineering confirms communications and power with the test round 150 are still functional and nothing disconnected during the ramming operations. Engineering then signals a clear-to-move-forward with the test to fire control, which clears ordnance personal bring out and load the powder charge, the breech 122 is then closed. The gun 120 is raised to the required elevation for the test, and the range is cleared of all personnel. Once cleared to fire, the gun crew remotely pulls the article 160, then range control fires the test round 150. The exemplary article 160 is caught in the catch arm 128. One can then rest the article 160 and shoot another test round 150.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An instrumentation article for removably attaching to an ammunition round in a gun chamber and connecting to a cable that extends through said chamber, said cable providing tensile pull and signal communication through said chamber, said article having a longitudinal axis that corresponds to said chamber and comprising:

a cap structure that connects to the cable;

an electronics package that provides electrical power and attaches to said cap structure for communication with the round;

a grip assembly that attaches to the round;

a release device that connects said electronics package to said grip assembly; and a lock mechanism disposed between said release device and said grip assembly and rotates in first and second directions along the axis, latching said claw assembly to the round by manual rotation in said first direction and withdrawing said grip assembly from the round by automatic rotation in said second direction, wherein said release device unlatches said lock mechanism.

2. The article according to claim 1, wherein the electronics package includes a battery retainer, a circuit board and a pigtail wire that attaches nano-d connectors at a first end on said circuit board and a second end on the round.

3. The article according to claim 1, wherein said electronics package and said cap structure are contained within an annular sleeve.

4. The article according to claim 1, wherein said grip assembly further includes:

an annular housing that attaches to said release device;

a circumferentially disposed plurality of wedges for attaching to said annular housing; and a complementary plurality of claws disposed between adjacent wedges, each claw pivoting on lateral hinges perpendicular to the longitudinal axis.

5. The article according to claim 4, wherein said annular housing includes a plurality of spheres within corresponding pockets angularly distributed in conformity with said plurality of claws to enable said each claw to pivot.

6. The article according to claim 4, wherein said each claw further includes a radially extending cavity that contains a helical spring to impose radially outward force for release of the round.

7. The article according to claim 1, wherein release mechanism further includes a removable pin, and said lock mechanism further includes:

an annular torsion set to impose said automatic rotation upon removal of said removable pin; and an outer ring for mounting said torsion set and for receiving said removable pin.

8. The article according to claim 7, wherein said lock mechanism further includes:

an anti-over-rotator to inhibit turning of said torsion set beyond prescription limit;

a fore plate disposed between said release mechanism and said outer ring to engage said anti-over-rotator; and an aft plate that attaches to said fore plate.

9. The article according to claim 7, wherein said torsion set includes:

an interior ring fixed by said release mechanism and said annular housing;

a plurality of helical springs connected to said interior ring and said outer ring.

* * * * *